United States Patent
Saarikivi et al.

(10) Patent No.: US 11,983,223 B2
(45) Date of Patent: May 14, 2024

(54) FINITE AUTOMATON CONSTRUCTION USING REGULAR EXPRESSION DERIVATIVES TO SIMULATE BEHAVIOR OF A BACKTRACKING ENGINE

(71) Applicant: Microsoft Technology Licensing, LLC, Redmond, WA (US)

(72) Inventors: Olli Ilari Saarikivi, Seattle, WA (US); Margus Veanes, Bellevue, WA (US); Stephen Harris Toub, Winchester, MA (US); Daniel J. Moseley, Jackson, WY (US); Jose Rodrigo Perez Rodriguez, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/890,931

(22) Filed: Aug. 18, 2022

(65) Prior Publication Data
US 2024/0061885 A1 Feb. 22, 2024

(51) Int. Cl.
*G06F 16/903* (2019.01)
*G06F 16/901* (2019.01)

(52) U.S. Cl.
CPC .... *G06F 16/90344* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 2013/0133064 A1* | 5/2013 | Goyal | H04L 63/1408 726/22 |
| 2014/0032607 A1* | 1/2014 | Hussain | G06F 16/24568 707/798 |
| 2015/0066927 A1* | 3/2015 | Goyal | H04L 41/28 707/737 |

(Continued)

OTHER PUBLICATIONS

Saarikivi, et al., "Captures support for NonBacktracking", Retrieved From: https://github.com/dotnet/runtime/commit/d78094e038fa72a561e13fe1471b12326e7c99ef, Feb. 12, 2022, 45 Pages.

(Continued)

*Primary Examiner* — Eddy Cheung
(74) *Attorney, Agent, or Firm* — Wade IP Law PLLC

(57) ABSTRACT

Techniques are described herein that are capable of constructing a finite automaton using regular expression derivatives to simulate behavior of a backtracking engine. The behavior indicates an order in which paths in an input regular expression are to be evaluated by the backtracking engine. The finite automaton is constructed to include a graph that includes a root node that represents the input regular expression. Regular expressions are derived such that each derived regular expression is a regular expression derivative of the input regular expression or of another derived regular expression. Priorities are assigned to alternations in the derived regular expressions to correspond to priorities indicated by the behavior. Nodes that represent the respective derived regular expressions and transitions between respective pairs of nodes are caused to be included in the graph. Priorities, which correspond to the order, are assigned to respective branches of the graph.

21 Claims, 8 Drawing Sheets

(56) References Cited

U.S. PATENT DOCUMENTS

| | | | | |
|---|---|---|---|---|
| 2015/0067836 | A1* | 3/2015 | Billa | H04L 41/28 |
| | | | | 726/22 |
| 2015/0295889 | A1* | 10/2015 | Goyal | H04L 63/1408 |
| | | | | 726/11 |
| 2015/0324457 | A1* | 11/2015 | McLean | G06F 16/3344 |
| | | | | 707/758 |
| 2016/0275205 | A1* | 9/2016 | Lehavi | G06F 40/289 |
| 2020/0019339 | A1* | 1/2020 | Yang | G06F 3/0604 |

OTHER PUBLICATIONS

"Getting started with Credential Scanner (CredScan)", Retrieved From: https://web.archive.org/web/20210325125749/ https://secdevtools.azurewebsites.net/helpcredscan.html, Mar. 25, 2021, 6 Pages.

"GNU Grep", Retrieved From: https://www.gnu.org/software/grep/, Aug. 8, 2020, 2 Pages.

"Performance Comparison of Regular Expression Engines", Retrieved From: https://zherczeg.github.io/sljit/regex_perf.html, Aug. 23, 2015, 3 Pages.

"Regular Expression Denial of Service—ReDoS", Retrieved From: https://web.archive.org/web/20200309080846/ https://owasp.org/www-community/attacks/Regular_expression_Denial_of_Service_-_ReDoS, Mar. 9, 2020, 4 Pages.

"Stack Exchange Network Status", Retrieved From: https://stackstatus.tumblr.com/post/147710624694/outage-postmortem-july-20-2016, Jul. 20, 2016, 2 Pages.

"System.Text.RegularExpressions", Retrieved From: https://github.com/dotnet/runtime/tree/main/src/libraries/System.Text.RegularExpressions, Retrieved On: Oct. 27, 2023, 2 Pages.

Antimirov, Valentin, "Partial Derivatives of Regular Expressions and Finite Automaton Constructions", In Journal of Theoretical Computer Science, vol. 155, Issue 2, Mar. 11, 1996, pp. 291-319.

Ausaf, et al., "POSIX Lexing with Derivatives of Regular Expressions (Proof Pearl)", Published in Interactive Theorem Proving, Aug. 22, 2016, pp. 69-86.

Baldwin, Adam, "Regular Expression Denial of Service affecting Express.js", Retrieved From: https://web.archive.org/web/20170116160113/https:/medium.com/node-security/regular-expression-denial-of-service-affecting-express-js-9c397c164c43, Jun. 16, 2016, 3 Pages.

Briggs, et al., "An Efficient Representation for Sparse Sets", In Journal of ACM Letters on Programming Languages and Systems, vol. 2, Issue 1-4, Mar. 1, 1993, pp. 59-69.

Brzozowski, Janusza., "Derivatives of Regular Expressions", In Journal of the Association for Computing Machinery, vol. 11, Issue 4, Oct. 1, 1964, pp. 481-494.

Budzianowski, et al., "MultiWOZ—A Large-Scale Multi-Domain Wizard-of-Oz Dataset for Task-Oriented Dialogue Modelling", In Proceedings of Conference on Empirical Methods in Natural Language Processing, Oct. 31, 2018, pp. 5016-5026.

Cox, Russ, "Regular Expression Matching in the Wild", Retrieved From: https://swtch.com/~rsc/regexp/regexp3.html, Mar. 2010, 7 Pages.

D'Antoni, et al., "Minimization of Symbolic Automata", In Proceedings of the 41st ACM SIGPLAN-SIGACT Symposium on Principles of Programming Languages, Jan. 22, 2014, pp. 541-553.

Davis, Jamesc., "Rethinking Regex Engines to Address ReDoS", In Proceedings of the 27th ACM Joint Meeting on European Software Engineering Conference and Symposium on the Foundations of Software Engineering, Aug. 26, 2019, pp. 1256-1258.

Davis, et al., "The Impact of Regular Expression Denial of Service (ReDoS) in Practice: An Empirical Study at the Ecosystem Scale", In Proceedings of 26th ACM Joint Meeting on European Software Engineering Conference and Symposium on the Foundations of Software Engineering, Nov. 4, 2018, pp. 246-256.

Fischer, et al., "A Play on Regular Expressions: Functional Pearl", In Proceedings of 15th ACM SIGPLAN International Conference on Functional Programming, Sep. 27, 2010, pp. 357-368.

Frisch, et al., "Greedy Regular Expression Matching", In Proceedings of 31st International Colloquium on Automata, Languages, and Programming, Jul. 12, 2004, 12 Pages.

George, et al., "Regular Expression Language—Quick Reference", Retrieved From: https://learn.microsoft.com/en-US/dotnet/standard/base-types/regular-expression-language-quick-reference, Jun. 18, 2022, 12 Pages.

Glushkov, V.M., "The Abstract Theory Of Automata", In Journal of Russian Mathematical Surveys, vol. 16, Issue 5, Oct. 31, 1961, pp. 1-54.

Graham-Cumming, John, "Details of the Cloudflare Outage on Jul. 2, 2019", Retrieved From: https://blog.cloudflare.com/details-of-the-cloudflare-outage-on-Jul.-Feb. 2019/, Jul. 12, 2019, 29 Pages.

Hooimeijer, et al., "An Evaluation of Automata Algorithms for String Analysis", In Proceedings of 12th International Workshop on Verification, Model Checking, and Abstract Interpretation, Jan. 23, 2011, pp. 248-262.

Juarez, et al., "Languages Regex Benchmark", Retrieved From: https://github.com/mariomka/regex-benchmark, Oct. 19, 2021, 6 Pages.

Kanevskiy, et al., "Intel Corporation", Retrieved From: https://web.archive.org/web/20211230190735/https://github.com/intel/, Dec. 30, 2021, 3 Pages.

Keil, et al., "Symbolic Solving of Extended Regular Expression Inequalities", In Proceedings of 34th International Conference on Foundation of Software Technology and Theoretical Computer Science, Dec. 12, 2014, pp. 175-186.

Kozen, Dexter, "Kleene Algebra with Tests", In Journal of ACM Transactions on Programming Languages and Systems, vol. 19, Issue 3, May 1, 1997, pp. 427-443.

Laurikari, Ville, "NFAs with Tagged Transitions, their Conversion to Deterministic Automata and Application to Regular Expressions", In Proceedings of Seventh International Symposium on String Processing and Information Retrieval, Sep. 27, 2000, pp. 181-187.

Liang, et al., "A Decision Procedure for Regular Membership and Length Constraints over Unbounded Strings", In Proceedings of 10th International Symposium on Frontiers of Combining Systems, Sep. 21, 2015, pp. 135-150.

Loring, et al., "Sound Regular Expression Semantics for Dynamic Symbolic Execution of JavaScript", In Proceedings of the 40th ACM SIGPLAN Conference on Programming Language Design and Implementation, Jun. 22, 2019, pp. 425-438.

Moseley, et al., "Artifact for Derivative Based Nonbacktracking Real-World Regex Matching with Backtracking Semantics", Retrieved From: https://zenodo.org/records/7709500, Mar. 8, 2023, 4 Pages.

Moseley, et al., "Derivative Based Nonbacktracking Real-World Regex Matching with Backtracking Semantics", Published in Technical Report of Microsoft Research, Apr. 2023, 29 Pages.

Moura, et al., "Z3: An Efficient SMT Solver", In Proceedings of 14th International Conference on Tools and Algorithms for the Construction and Analysis of Systems, Mar. 29, 2008, pp. 337-340.

Owens, et al., "Regular-Expression Derivatives Re-Examined", In Journal of Functional Programming, vol. 19, Issue 2, Mar. 1, 2009, pp. 173-190.

Pous, Damien, "Symbolic Algorithms for Language Equivalence and Kleene Algebra with Tests", In Proceedings of the 42nd Annual ACM SIGPLAN-SIGACT Symposium on Principles of Programming Languages, Jan. 15, 2015, pp. 357-368.

Reynolds, et al., "CVC4", Retrieved From: https://web.archive.org/web/20210118012706/https://github.com/cvc4/cvc4, Jun. 19, 2020, 3 Pages.

Saarikivi, et al., "Symbolic Regex Matcher", In Proceedings of International Conference on Tools and Algorithms for the Construction and Analysis of Systems, Apr. 6, 2019, pp. 372-378.

Sitnik, et al., "NET Performance", Retrieved From: https://github.com/dotnet/performance, Retrieved On: Oct. 27, 2023, 2 Pages.

Stanford, et al., "Symbolic Boolean Derivatives for Efficiently Solving Extended Regular Expression Constraints", In Proceedings

(56) References Cited

OTHER PUBLICATIONS of the 42nd ACM SIGPLAN International Conference on Programming Language Design and Implementation, Jun. 20, 2021, pp. 620-635.

Stockmeyer, et al., "Word Problems Requiring Exponential Time: Preliminary Report", In Proceedings of the Fifth Annual ACM Symposium on Theory of Computing, Apr. 30, 1973, 9 Pages.

Sulzmann, et al., "Regular Expression Sub-Matching using Partial Derivatives", In Proceedings of the 14th Symposium on Principles and Practice of Declarative Programming, Sep. 19, 2012, pp. 79-90.

Thompson, Ken, "Programming Techniques: Regular Expression Search Algorithm", In Journal of Communications of the ACM, vol. 11, Issue 6, Jun. 1, 1968, pp. 419-422.

Turonova, et al., "Counting in Regexes Considered Harmful: Exposing ReDOS Vulnerability of Nonbacktracking Matchers", In Proceedings of the 31st USENIX Security Symposium, Aug. 10, 2022, pp. 4165-4182.

Turonova, et al., "Regex Matching with Counting-Set Automata", In Proceedings of the ACM on Programming Languages, vol. 4, Issue OOPSLA, Nov. 13, 2020, pp. 1-30.

Wankadia, et al., "google / re2", Retrieved From: https://web.archive.org/web/20210206204846/https://github.com/google/re2, Feb. 2, 2021, 2 Pages.

Wingbrant, Ola, "Regular Languages, Derivatives and Finite Automata", In Repository of arXiv: 1907.13577v1, Jul. 21, 2019, pp. 1-75.

Berglund, et al., "Formalising and implementing Boost POSIX regular expression matching," in Theoretical Computer Science, vol. 857, 2021, pp. 147-165.

Spencer, Henry, "A regular-expression matcher," in Software Solutions in C, Academic Press Professional, Inc., San Diego, CA, USA, 1994, pp. 35-71.

\* cited by examiner

$$HPNullable(R\{0,n\}?) = true \longleftarrow 202$$
$$HPNullable(RS) = HPNullable(R) \text{ and } HPNullable(S) \longleftarrow 204$$
$$HPNullable(R|S) = HPNullable(R) \longleftarrow 206$$
$$HPNullable(\epsilon) = true \longleftarrow 208$$
$$HPNullable(R) = false \text{ otherwise} \longleftarrow 210$$

$$\delta_a(RS) = \begin{cases} \delta_a(R)S & \text{if } \neg Nullable(R) \longleftarrow 212 \\ \delta_a(S)|\delta_a(R)S & \text{if } HPNullable(R) \longleftarrow 214 \\ \delta_a(R)S|\delta_a(S) & \text{otherwise} \longleftarrow 216 \end{cases}$$

FIG. 2

$$Prune(R|S) = \begin{cases} Prune(R) & \text{if } Nullable(R) \longleftarrow 302 \\ R|Prune(S) & \text{otherwise} \longleftarrow 304 \end{cases}$$

$$Prune((R|S)T) = \begin{cases} Prune(RT) & \text{if } Nullable(R) \longleftarrow 306 \\ RT|Prune(ST) & \text{otherwise} \longleftarrow 308 \end{cases}$$

$$Prune(RS) = Prune(R)Prune(S) \longleftarrow 310$$
$$Prune(R\{0,n\}?) = \epsilon \longleftarrow 312$$
$$Prune(R) = R \text{ otherwise} \longleftarrow 314$$

FIG. 3

FINITE AUTOMATON CONSTRUCTION USING REGULAR EXPRESSION DERIVATIVES TO SIMULATE BEHAVIOR OF A BACKTRACKING ENGINE

BACKGROUND

A string-searching algorithm (a.k.a. a string-matching algorithm) is an algorithm that attempts to find a substring (a.k.a. a pattern) in an input character sequence based on (e.g., based at least in part on) a regular expression that defines the substring. A regular expression (a.k.a. a pattern) is at least one element (e.g., a sequence of elements) that defines one or more substrings. Each element of the regular expression includes one or more characters (e.g., textual character(s)), one or more symbols, or any combination thereof. Each symbol may represent one or more characters. For example, the symbol "\w" represents any word character. The string-searching algorithm evaluates the regular expression on the input character sequence to determine whether the input character sequence includes any of the sub strings that are defined by the regular expression.

A backtracking engine is one type of engine that utilizes a string-searching algorithm to search input character sequences. A backtracking engine is configured to find a solution to a computational problem by incrementally building candidates to the solution and abandoning a candidate when a determination is made that the candidate cannot be completed to a valid solution. Backtracking engines have become the industry standard for searching input character sequences due to their ease of implementation and relatively wide feature set. Unfortunately, the worst-case matching time of backtracking engines increases exponentially with an increase in the complexity (e.g., length) of the input character sequence, which may result in unpredictable performance and/or may cause denial of service attacks.

Automaton-based matching techniques have been proposed to address the worst-case matching time issues associated with backtracking engines. For instance, the automaton-based matching techniques may guarantee linear-time matching. However, using a regular expression as a basis for a string-searching algorithm by a conventional automaton-based matching technique often does not result in the same substrings being matched as a backtracking engine.

SUMMARY

Various approaches are described herein for, among other things, constructing a finite automaton using regular expression derivatives to simulate behavior of a backtracking engine. A finite automaton is an automaton that is configured to be in one of a finite number of states at any given time. An automaton is logic that automatically follows a sequence of operations and/or responds to predetermined instructions. A regular expression derivative is a derivative of a regular expression with regard to a character in an alphabet. The derivative of the regular expression is a remainder of the regular expression that follows an element of the regular expression that corresponds to (e.g., matches) the character in the alphabet.

For example, assume that an input regular expression is ABC, and an input character sequence is ABX. The derivative of the regular expression ABC with regard to the first element, A, of the input character sequence is BC because BC is the remainder of the input regular expression that follows the A in the input regular expression. The derivative of the derived regular expression BC with regard to the second element, B, of the input character sequence is C because C is the remainder of the input regular expression that follows the B in the input regular expression. A derived regular expression is a regular expression that is a derivative of another regular expression. The derivative of the derived regular expression C with regard to the third element, X, of the input character sequence is nothing because the C does not correspond to (e.g., does not match) the X. It will be recognized that if the input character sequence had been ABC, the derivative of the derived regular expression C with regard to the third element, C, of the input character sequence would have been an empty string because the input regular expression includes no elements after the C. In an example approach, behavior of a backtracking engine is determined.

The behavior indicates an order in which paths in an input regular expression are to be evaluated by the backtracking engine. A finite automaton that represents the input regular expression is constructed using regular expression derivatives that are based on the input regular expression. The finite automaton includes a graph that includes a root node that represents the input regular expression. Constructing the finite automaton includes deriving regular expressions such that each derived regular expression is a regular expression derivative of the input regular expression with regard to a character in an alphabet or a regular expression derivative of another derived regular expression with regard to a character in the alphabet. Constructing the finite automaton further includes assigning priorities to each plurality of respective related alternations in the derived regular expressions to correspond to an order in which the behavior indicates that the respective plurality of related alternations are to be evaluated by the backtracking engine. Constructing the finite automaton further includes causing nodes that represent the respective derived regular expressions to be included in the graph. Constructing the finite automaton further includes causing transitions between respective pairs of nodes in a corpus of nodes that includes the root node and the nodes that represent the respective derived regular expressions to be included in the graph. Priorities are assigned to respective branches of the graph in the finite automaton. The priorities correspond to the order in which the respective paths in the input regular expression are to be evaluated by the backtracking engine. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 2 depicts example recursive function definitions to implement a "high-priority nullability" property in accordance with an embodiment.

FIG. 3 depicts example recursive function definitions to implement pruning functionality in accordance with an embodiment.

Figure 1:
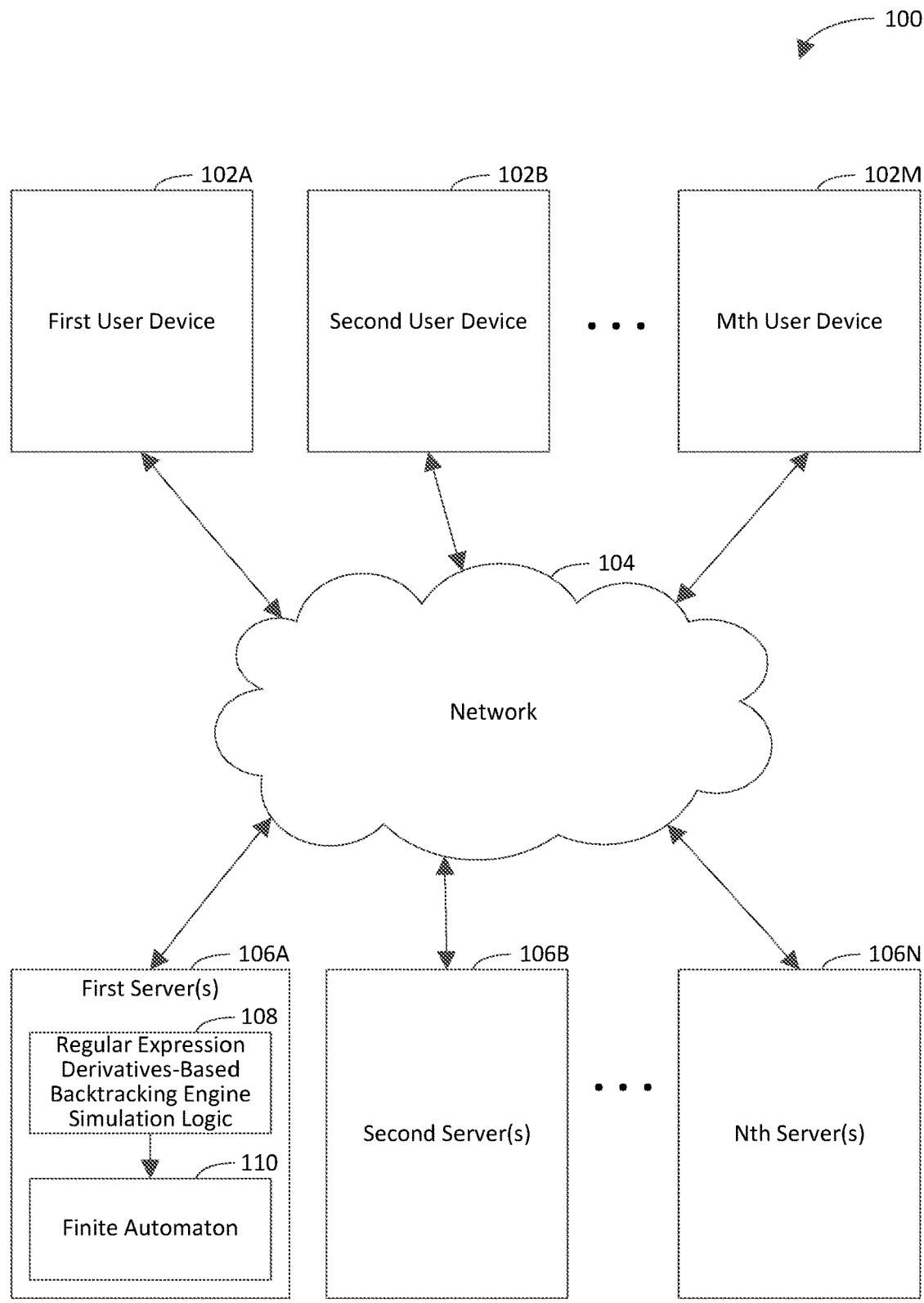
FIG. 1 is a block diagram of an example regular expression derivatives-based backtracking engine simulation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

Example embodiments described herein are capable of constructing a finite automaton using regular expression derivatives to simulate behavior of a backtracking engine. A finite automaton is an automaton that is configured to be in one of a finite number of states at any given time. An automaton is logic that automatically follows a sequence of operations and/or responds to predetermined instructions. A regular expression derivative is a derivative of a regular expression with regard to a character in an alphabet. The derivative of the regular expression is a remainder of the regular expression that follows an element of the regular expression that corresponds to (e.g., matches) the character in the alphabet.

For example, assume that an input regular expression is ABC, and an input character sequence is ABX. The derivative of the regular expression ABC with regard to the first element, A, of the input character sequence is BC because BC is the remainder of the input regular expression that follows the A in the input regular expression. The derivative of the derived regular expression BC with regard to the second element, B, of the input character sequence is C because C is the remainder of the input regular expression that follows the B in the input regular expression. A derived regular expression is a regular expression that is a derivative of another regular expression. The derivative of the derived regular expression C with regard to the third element, X, of the input character sequence is nothing because the C does not correspond to (e.g., does not match) the X. It will be recognized that if the input character sequence had been ABC, the derivative of the derived regular expression C with regard to the third element, C, of the input character sequence would have been an empty string because the input regular expression includes no elements after the C.

Example techniques described herein have a variety of benefits as compared to conventional techniques for using a regular expression to search an input character sequence. For instance, in using a regular expression as a basis for a string-searching algorithm, the example techniques are capable of matching the same substrings in an input character sequence as a backtracking engine. For example, the example techniques evaluate paths in the regular expression in the same order as a backtracking engine would evaluate the paths. In accordance with this example, the example techniques evaluate alternations and/or captures in the same order as the backtracking engine.

An alternation is a logical disjunction of two patterns that describe sets of strings. For example, the alternation AB|EF is the logical disjunction of a first pattern, AB, and a second pattern, EF. In accordance with this example, the alternation AB|EF may be described as AB or EF.

A capture is a portion of a regular expression that is distinguished from other portion(s) of the regular expression to enable isolation of a corresponding portion of a substring that is defined by the regular expression from other portion(s) of the substring. For instance, defining the capture may enable the corresponding portion of the substring to be extracted from the substring for review or processing. Substrings that are defined by the capture are said to be included in the capture. In an example implementation, each capture in a regular expression is defined by placing parentheses around a portion of the regular expression that is to be distinguished from other portion(s) of the regular expression. For instance, in the regular expression (AB)C, AB is within parentheses to indicate that AB is a capture within the regular expression.

The example techniques are capable of modifying the regular expression derivative creation process to match the semantics of a backtracking engine. For instance, the example techniques may modify the derivation rules associated with the derivative creation process such that instead of regular expressions encoding the language to be accepted after consuming an additional character, the regular expressions encode the states that a backtracking engine would potentially visit before ending execution. In an example, using traditional semantics, the regular expression derivative of the regular expression a?|aa with regard to a is d_a(a|aa)=( )|a. Note that the first alternative in this derivative accepts the empty string ( ), meaning that the backtracking engine in this example would stop there before exploring the second alternative. The example techniques may be capable of defining the regular expression derivative of the regular expression a?|aa to be d_a(a|aa)=( ), explicitly indicating that the preferred end of the match is after one a. Similar modifications to the rules can be made to support faithful semantics for eager and lazy loops. Applying simplification rules on derived regular expressions may ensure a finite state space in the automaton and may lead to a smaller automaton than naïve constructions (e.g., the popular Thompson's construction). For example, by detecting subsumption of patterns (e.g., patterns that arise from loops), the example techniques may avoid exponential increases in the size of the state space. By ensuring a finite state space, the example techniques may enable utilization of a deterministic simulation mode, which is faster than a nondeterministic simulation mode, for a larger class of patterns. The example techniques may be applicable to Brzozowski and Antimirov style derivatives, which roughly correspond to deterministic finite automaton (DFA) and nondeterministic finite automaton (NFA) simulation, respectively. If backtracking simulation is undesirable for some parts of the matching process (e.g., a reverse pass to find a match starting point), the pattern may be modified to include metadata that makes derivative creation revert back to language-theoretic semantics. The example techniques are capable of modifying the NFA simulator to remember the order of states created by the Antimirov style derivative creation process (e.g., by employing the well-known SparseIntSet data structure, which is a fast order-preserving map optimized for relatively small integers).

The example techniques provide a relatively strong semantic foundation offered by the derivative creation process, which makes developing new features relatively straightforward by avoiding automata analyses. The example techniques may support laziness in the construction of the automaton, which may enable expanding only the parts of an automaton that are required for identifying a substring of an input character sequence that corresponds to an input regular expression.

The example techniques may enable seamless switching between using a backtracking engine and using a non-backtracking engine (e.g., an automaton) to search an input character sequence based on a regular expression. For instance, the example techniques may retain ordering of states (i.e., nodes) and transitions in the graph when switching between the backtracking engine and the non-backtracking engine. Accordingly, the example techniques may enable the backtracking engine and the non-backtracking engine to produce the same matched substrings when evaluating the same regular expression on the same input character sequence. The example techniques may guarantee linear-time matching. For instance, the example techniques may be capable of reviewing each character of the input character sequence a number of times that is less than or equal to a threshold number of times. The example techniques may be simpler than conventional techniques for preserving transition priorities in automaton-based engines. One such conventional technique utilizes the RE2™ regular expression library, which is developed and distributed by Google Inc. The RE2™ regular expression library implements this as part of the NFA construction; whereas the example techniques may be fully contained in the derivative creation process, which enables direct DFA simulation. The RE2™ regular expression library tracks NFA state priorities even when performing DFA simulation and avoids tracking NFA state priorities when finding the start of a match by running a backwards match on a reversed pattern; whereas the example techniques may be capable of cleanly separating the tracking of state priorities from DFA execution, meaning that the DFA execution code can be simpler.

The example techniques may reduce an amount of time and/or resources (e.g., processor cycles, memory, network bandwidth) that is consumed to evaluate a regular expression on an input character sequence. For instance, by constructing a finite automaton using regular expression derivatives to simulate behavior of a backtracking engine, the time and/or resources that would have been consumed to identify substrings in the input character sequence that correspond to the regular expression can be reduced. By reducing the amount of time and/or resources that is consumed by a computing system to identify substrings in the input character sequence that correspond to the regular expression, the efficiency of the computing system may be increased. The example techniques may increase an efficiency and/or a user experience of a user who initiates evaluation of a regular expression on an input character sequence, for example, by avoiding the unpredictable performance and/or denial of service attacks that are associated with techniques that utilize a backtracking engine.

FIG. 1 is a block diagram of an example regular expression derivatives-based backtracking engine simulation system 100 in accordance with an embodiment. Generally speaking, the regular expression derivatives-based backtracking engine simulation system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the regular expression derivatives-based backtracking engine simulation system 100 constructs a finite automaton 110 using regular expression derivatives to simulate behavior of a backtracking engine. Detail regarding techniques for constructing a finite automaton using regular expression derivatives to simulate behavior of a backtracking engine is provided in the following discussion.

As shown in FIG. 1, the regular expression derivatives-based backtracking engine simulation system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the regular expression derivatives-based backtracking engine simulation system 100.

The first server(s) 106A are shown to include regular expression derivatives-based backtracking engine simulation logic 108 and the finite automaton 110 for illustrative purposes. The regular expression derivatives-based backtracking engine simulation logic 108 is configured to determine behavior of a backtracking engine. The behavior indicates an order in which paths in an input regular expression are to be evaluated by the backtracking engine. The regular expression derivatives-based backtracking engine simulation logic 108 is further configured to construct the finite automaton 110, which represents the input regular expression, using regular expression derivatives that are based on the input regular expression. The finite automaton 110 includes a graph that includes a root node that represents the input regular expression. Constructing the finite automaton 110 includes deriving regular expressions such that each derived regular expression is a regular expression derivative of the input regular expression with regard to a character in an alphabet or a regular expression derivative of another derived regular expression with regard to a character in the alphabet. Constructing the finite automaton 110 further includes assigning priorities to each plurality of respective related alternations in the derived regular expressions to correspond to an order in which the behavior indicates that the respective plurality of related alternations are to be evaluated by the backtracking engine. Constructing the finite automaton 110 further includes causing nodes that represent the respective derived regular expressions to be included in the graph. Constructing the finite automaton 110 further includes causing transitions between respective pairs of nodes in a corpus of nodes that includes the root node and the nodes that represent the respective derived regular expressions to be included in the graph. The regular expression derivatives-based backtracking engine simulation logic 108 is further configured to assign priorities to respective branches of the graph in the finite automaton 110. The priorities correspond to the order in which the respective paths in the input regular expression are to be evaluated by the backtracking engine. In an example implementation, the regular expression derivatives-based backtracking engine simulation logic 108 utilizes a two phase approach to identify a substring in an input character sequence that corresponds to (e.g., matches) the regular expression R. The substring in the input character sequence that corresponds to the regular expression may be referred to as a "match". In the first phase, the regular expression derivatives-based backtracking engine simulation logic 108 runs the finite automaton 110 for .*?R until the end position of the preferred match is found. This is done by keeping track of the last identified candidate position and walking further while a longer match might exist. It should be noted that the pattern .*? accepts an arbitrary string with as few characters as possible. In the second phase, the regular expression derivatives-based backtracking engine simulation logic 108 runs the reverse of R from the end position until the earliest start position is found. For regular expression derivatives, a match in the first phase is found whenever a state (a.k.a. node) that represents a nullable pattern is reached. A nullable pattern is a pattern that is capable of accepting an empty string. For instance, the nullable pattern may include the empty string.

In another example implementations, the regular expression derivatives-based backtracking engine simulation logic 108 orders alternations in regular expressions in a way that matches the order that a backtracking engine would explore corresponding paths of the regular expression. For Brzozowski derivatives, the regular expression derivatives-based backtracking engine simulation logic 108 may modify the derivation rules with a new "high-priority nullability" property that indicates the order of the cases for concatenation when the left side is nullable. A high-priority nullability operation may be performed on a regular expression to determine whether the regular expression is high-priority nullable. A regular expression that is high-priority nullable is a regular expression that satisfies the following criteria: (1) the regular expression is nullable, and (2) the backtracking engine would prefer to accept the empty string (over anything else) into the regular expression. FIG. 2 depicts example recursive function definitions 202, 204, 206, 208, 210, 212, 214, and 216 that can be used to implement the "high-priority nullability" property in accordance with an embodiment. For instance, recursive function definitions 202, 204, 206, 208, and 210 can be used to determine whether various regular expressions are high-priority nullable, and recursive function definitions 212, 214, and 216 can be implemented to modify derivation rules. The recursive function definitions in FIG. 2 are described with reference to regular expressions R and S for purposes of illustration.

A first recursive functional definition 202 indicates a result of performing a high-priority nullability operation on R{0,n}?, which indicates that R establishes a loop that is capable of accepting zero repetitions of R and that is capable of accepting a positive number of repetitions of R but that prefers to accept fewer repetitions of R rather than more repetitions of R. It will be recognized that if n were equal to infinity, then R{0,n}? would be written as R*?. The result in the first recursive functional definition 202 is true, meaning that R{0,n}? is high-priority nullable.

A second recursive functional definition 204 indicates a result of performing a high-priority nullability operation on RS (i.e., R concatenated with S). The result in the second recursive functional definition 204 is a result of performing a high-priority nullability operation on R and performing a high-priority nullability operation on S. Accordingly, in order for the concatenation of R and S to be high-priority nullable, R must be high-priority nullable, and S must be high-priority nullable.

A third recursive functional definition 206 indicates a result of performing a high-priority nullability operation on R|S. The result in the third recursive functional definition 206 is a result of performing a high-priority nullability operation on R. It will be recognized that the S is removed because S has a lower priority than R as a result of R being nullable and being an alternative that is to the left of the alternative S in the alternation R|S.

A fourth recursive functional definition 208 indicates a result of performing a high-priority nullability operation on an empty string, E. The result in the fourth recursive functional definition 208 is true.

A fifth recursive functional definition 210 indicates a result of performing a high-priority nullability operation on R otherwise (i.e., if R is not the empty string). The result in the fifth recursive functional definition 210 is false.

A sixth recursive functional definition 212 indicates a derivative of RS with regard to an arbitrary character, which labeled "a" for purposes of illustration, if R is not nullable. The derivative of RS with regard to the arbitrary character is depicted as $\delta_a(RS)$. The result in the sixth recursive functional definition 212 is $\delta_a(R)S$, which means a derivative of R followed by S.

A seventh recursive functional definition 214 indicates a derivative of RS with regard to the arbitrary character if R is high-priority nullable. The result in the seventh recursive functional definition 214 is $\delta_a(S)|\delta_a(R)S$, which means a derivative of S or a derivative of R followed by S.

An eighth recursive functional definition 216 indicates a derivative of RS with regard to the arbitrary character otherwise (i.e., if the sixth and seventh recursive functional definitions 212 and 214 are not applicable). The result in the eighth recursive functional definition 216 is $\delta_a(R)S|\delta_a(S)$, which means a derivative of R followed by S or a derivative of S.

In accordance with this implementation, the regular expression derivatives-based backtracking engine simulation logic 108 may ensure that the simplification rules employed by the regular expression derivatives-based backtracking engine simulation logic 108 respect the ordered semantics of alternations. Using this ordering, when a state with a derived regular expression that is nullable is reached, the regular expression derivatives-based backtracking engine simulation logic 108 may perform a pruning operation on the derived regular expression such that any potential longer matches that would be less preferred by the backtracking engine are cut away. FIG. 3 depicts example recursive function definitions 302, 304, 306, 308, 310, 312, and 314 that can be used to implement the pruning functionality in accordance with an embodiment. The recursive function definitions in FIG. 3 are described with reference to regular expressions R, S, and T for purposes of illustration.

A first recursive functional definition 302 indicates a result of performing a pruning operation on NS if R is nullable (i.e., if R is capable of accepting an empty string). The result in the first recursive functional definition 302 is the result of performing a pruning operation on R. It will be recognized that the S is removed because S has a lower priority than R as a result of R being nullable and being an alternative that is to the left of the alternative S in the alternation R|S. A second recursive functional definition 304 indicates a result of performing a pruning operation on R|S if R is not nullable. The result in the second recursive functional definition 304 is an alternation that includes a first alternative and a second alternative. The first alternative is R. It is noted that a pruning operation is not performed on R in the result because there is nothing to prune inside R as a result of R not being nullable. The second alternative is a result of performing a pruning operation on S.

A third recursive functional definition 306 indicates a result of performing a pruning operation on (R|S)T if R is nullable. The result in the third recursive functional definition 306 is a result of performing a pruning operation on RT. Accordingly, the result in the third recursive functional definition 306 does not include S.

A fourth recursive functional definition 308 indicates a result of performing a pruning operation on (R|S)T if R is not nullable. The result in the fourth recursive functional definition 308 is an alternation that includes a first alternative and a second alternative. The first alternative is RT. The second alternative is a result of performing a pruning operation on ST.

A fifth recursive functional definition 310 indicates a result of performing a pruning operation on RS. The result in the fifth recursive functional definition 310 is a result of performing a pruning operation on R concatenated with a result of performing a pruning operation on S.

A sixth recursive functional definition 312 indicates a result of performing a pruning operation on R{0,n}?, which indicates that R establishes a loop that is capable of accepting zero repetitions of R and that is capable of accepting a positive number of repetitions of R. It will be recognized that if n were equal to infinity, then R{0,n}? would be written as R*?. The result in the sixth recursive functional definition 312 is an empty string, indicated by E.

A seventh recursive functional definition 314 indicates a result of performing a pruning operation on R otherwise (i.e., if the sixth recursive functional definition 312 is not applicable). The result in the seventh recursive functional definition 314 is R.

The ordering and pruning described with regard to this implementation make regular expression derivatives correspond to the states that a backtracking engine could visit in the current input position for any future input based on the input so far. It should be noted that for a nondeterministic automaton, the ordered alternations can be interpreted into prioritized lists of successor states.

The regular expression derivatives-based backtracking engine simulation logic 108 may be implemented in various ways to construct the finite automaton 110 using regular expression derivatives to simulate behavior of a backtracking engine, including being implemented in hardware, software, firmware, or any combination thereof. For example, the regular expression derivatives-based backtracking engine simulation logic 108 may be implemented as computer program code configured to be executed in one or more processors. In another example, at least a portion of the regular expression derivatives-based backtracking engine simulation logic 108 may be implemented as hardware logic/electrical circuitry. For instance, at least a portion of the regular expression derivatives-based backtracking engine simulation logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The regular expression derivatives-based backtracking engine simulation logic 108 and the finite automaton 110 are shown to be incorporated in the first server(s) 106A for illustrative purposes and are not intended to be limiting. It will be recognized that the regular expression derivatives-based backtracking engine simulation logic 108 (or any portion(s) thereof) may be incorporated in any one or more of the servers 106A-106N, any one or more of the user devices 102A-102M, or any combination thereof. For example, client-side aspects of the regular expression derivatives-based backtracking engine simulation logic 108 may be incorporated in one or more of the user devices 102A-102M, and server-side aspects of regular expression derivatives-based backtracking engine simulation logic 108 may be incorporated in one or more of the servers 106A-106N. It will be further recognized that the finite automaton 110 (or any portion(s) thereof) may be incorporated in any one or more of the servers 106A-106N, any one or more of the user devices 102A-102M, or any combination thereof.

Figure 4:
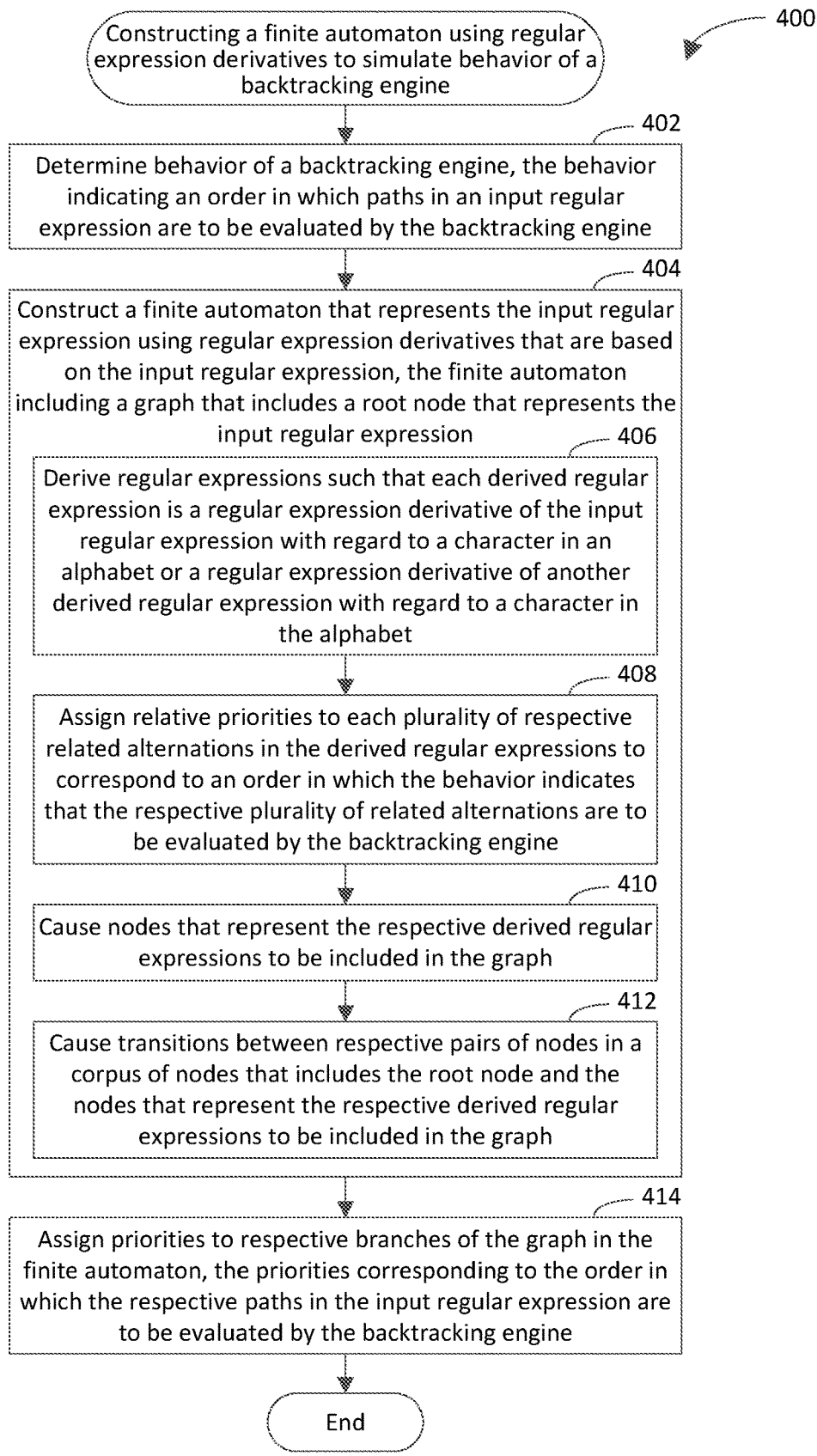
FIGS. 4 and 6 depict flowcharts of example methods for constructing a finite automaton using regular expression derivatives to simulate behavior of a backtracking engine in accordance with embodiments.
Figure 5:
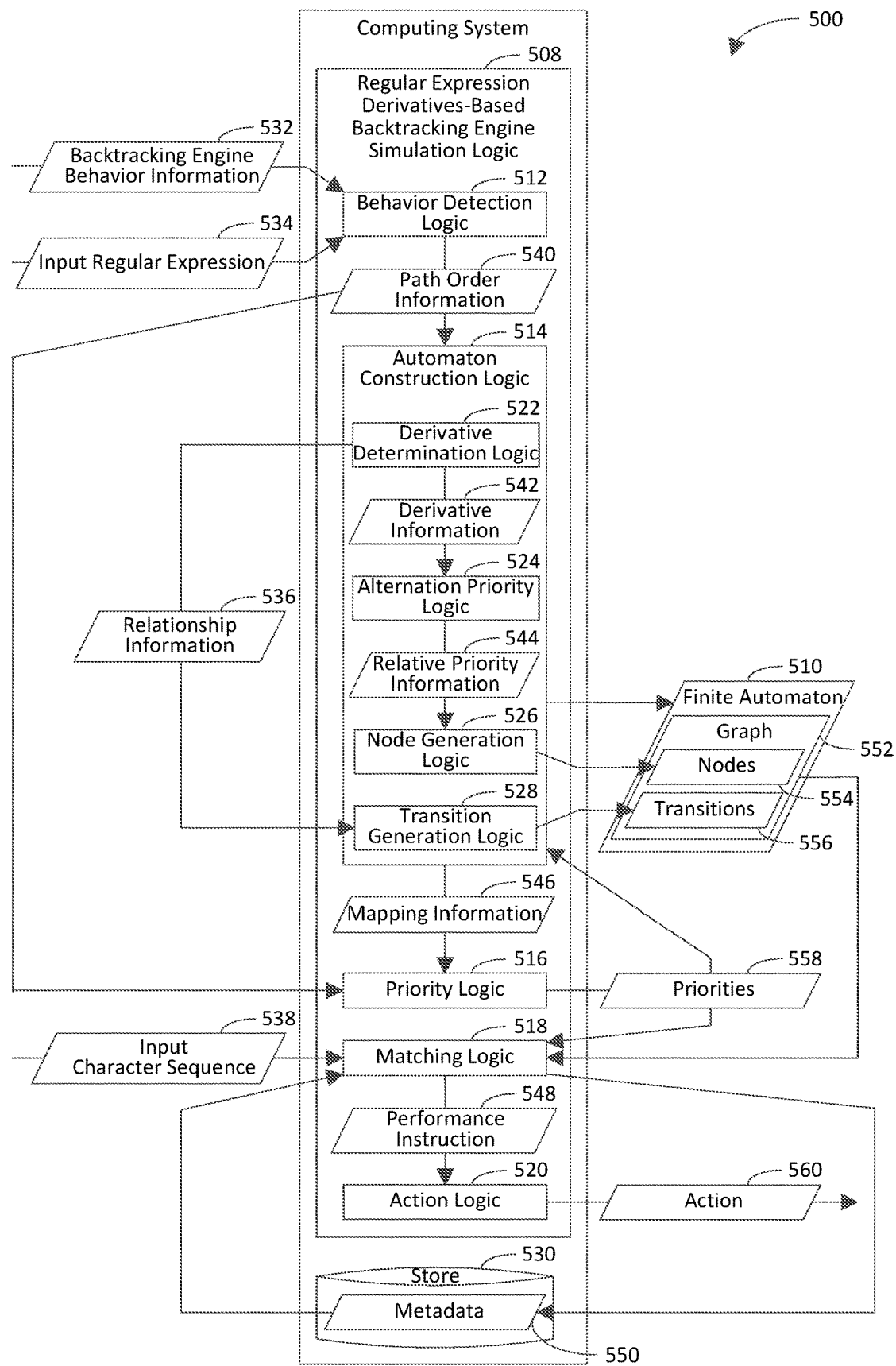
FIG. 5 is a block diagram of an example computing system in accordance with an embodiment.

FIG. 4 depicts a flowchart 400 of an example method for constructing a finite automaton using regular expression derivatives to simulate behavior of a backtracking engine in accordance with an embodiment. Flowchart 400 may be performed by the first server(s) 106A shown in FIG. 1, for example. For illustrative purposes, flowchart 400 is described with respect to computing system 500 shown in FIG. 5, which is an example implementation of the first server(s) 106A. As shown in FIG. 5, the computing system 500 includes regular expression derivatives-based backtracking engine simulation logic 508 and a store 530. The regular expression derivatives-based backtracking engine simulation logic 508 includes behavior detection logic 512, automaton construction logic 514, priority logic 516, matching logic 518, and action logic 520. The automaton construction logic 514 includes derivative determination logic 522, alternation priority logic 524, node generation logic 526, and transition generation logic 528. The store 530 may be any suitable type of store. One type of store is a database. For instance, the store 530 may be a relational database, an entity-relationship database, an object database, an object relational database, or an extensible markup language (XML) database. The store 530 is shown to store metadata 550 for non-limiting, illustrative purposes. Further structural and operational embodiments will be apparent to persons skilled in the relevant art(s) based on the discussion regarding flowchart 400.

As shown in FIG. 4, the method of flowchart 400 begins at step 402. In step 402, behavior of a backtracking engine is determined. The behavior indicates an order in which paths in an input regular expression are to be evaluated by the backtracking engine. It will be recognized that the paths may correspond to the respective ways in which the input regular expression is capable of being matched. In an example implementation, the behavior detection logic 512 determines the behavior of the backtracking engine. For example, the behavior detection logic 512 may determine the behavior based on backtracking engine behavior information 532. The behavior detection logic 512 may gather the backtracking engine behavior information 532 by analyzing the behavior of the backtracking engine during execution of the backtracking engine or by retrieving the backtracking engine behavior information 532 from a repository (e.g., store 530). For instance, the backtracking engine behavior information 532 may include a Perl compatible regular expressions (PCRE) library. The PCRE library implements a regular expression engine that is based on capabilities of the Perl programming language. In accordance with this implementation, the behavior detection logic 512 generates path order information 540, which specifies an order in which paths in an input regular expression 534 are to be evaluated by the backtracking engine. For instance, the behavior detection logic 512 may generate the path order information 540 based on an analysis of the backtracking engine behavior information 532.

At step 404, a finite automaton is constructed that represents the input regular expression using regular expression derivatives that are based on the input regular expression. Each regular expression derivative that is based on the input regular expression may be a regular expression derivative of the input regular expression, a regular expression derivative of a regular expression derivative of the input regular expression, a regular expression derivative of a regular expression derivative of a regular expression derivative of the input regular expression, and so on. Constructing the finite automaton at step 404 may include parsing the input regular expression to identify the elements therein. The finite automaton includes a graph that includes a root node that represents the input regular expression. It will be recognized that the graph may be constructed to represent the different ways in which the input regular expression may be matched. In an example implementation, automaton construction logic 514 constructs the finite automaton 510 to represent the input regular expression 534 using regular expression derivatives that are based on the input regular expression 534. The finite automaton 510 includes a graph 552, which includes a root node that represents the input regular expression 534.

Step 404 includes steps 406, 408, 410, and 412. At step 406, regular expressions are derived such that each derived regular expression is a regular expression derivative of the input regular expression with regard to a character in an alphabet or a regular expression derivative of another derived regular expression with regard to a character in the alphabet. In an example implementation, the derivative determination logic 522 derives the regular expressions such that each derived regular expression is a regular expression derivative of the input regular expression 534 with regard to a character in the alphabet or a regular expression derivative of another derived regular expression with regard to a character in the alphabet. The derivative determination logic 522 may generate derivative information 542 to indicate the derived regular expressions. The derivative determination logic 522 may generate relationship information 536 to indicate relationships among the derived regular expressions.

In an example embodiment, an identified regular expression in the graph includes a first alternation, which is capable of accepting an empty string, followed by a second alternation. In accordance with this embodiment, if the behavior of the backtracking engine indicates that the first alternation prioritizes acceptance of the empty string over acceptance of a different element, deriving the regular expressions at step 406 includes defining a regular expression derivative of the identified regular expression to be a derivative of the second alternation or a derivative of the identified regular expression. In further accordance with this embodiment, if the behavior of the backtracking engine indicates that the first alternation does not prioritize acceptance of the empty string over acceptance of a different element, deriving the regular expressions at step 406 includes defining the regular expression derivative of the identified regular expression to be a derivative of the first alternation or a derivative of the second alternation.

At step 408, relative priorities are assigned to each plurality of respective related alternations in the derived regular expressions to correspond to an order in which the behavior indicates that the respective plurality of related alternations are to be evaluated by the backtracking engine. In an example implementation, the alternation priority logic 524 assigns the relative priorities to each plurality of respective related alternations in the derived regular expressions. For instance, the alternation priority logic 524 may analyze the derivative information 542 to determine the derived regular expressions and each plurality of related alternations therein. The alternation priority logic 524 may generate relative priority information 544 to indicate the relative priorities that are assigned to each plurality of respective related alternations in the derived regular expressions. The relative priority information 544 may also indicate the derived regular expressions and which of the derived regular expressions include each plurality of related alternations.

At step 410, nodes that represent the respective derived regular expressions are caused to be included in the graph. In an example implementation, the node generation logic 526 causes the nodes that represent the respective derived regular expressions to be included in nodes 554 of the graph 552. For instance, the node generation logic 526 may add each node that represents a derived regular expression to the nodes 554 of the graph 552 in real-time (e.g., on-the-fly) as the derived regular expression is derived. In an example, the node generation logic 526 may generate the nodes 554 in the graph 552 based on the relative priority information 544. In accordance with this example, the node generation logic 526 may generate a node for each derived regular expression that is indicated by the relative priority information 544.

In an example embodiment, causing the nodes to be included in the graph at step 410 includes, for each of the derived regular expressions that is not represented by a node in the graph, creating the node, which represents the regular expression, in the graph. In accordance with this embodiment, causing the nodes to be included in the graph at step 410 further includes, for each of the derived regular expressions that is represented by an existing node in the graph, using the existing node to represent the respective regular expression rather than creating another node to represent the respective derived regular expression.

At step 412, transitions between respective pairs of nodes in a corpus of nodes, which includes the root node and the nodes that represent the respective derived regular expressions, are caused to be included in the graph. In an example embodiment, each node that represents a respective derived regular expression is reachable by one or more transitions from the root node. In an example implementation, the transition generation logic 528 causes transitions 556 between respective pairs of the nodes, which are included in the nodes 554 of the graph 554, to be included in the graph 552. For instance, the transition generation logic 528 may add each transition to the transitions 556 in the graph 552 in real-time as the respective pair of nodes that defines the respective transition is identified (e.g., derived).

In another example implementation, the automaton construction logic 514 generates mapping information 546 that cross-references branches of the graph 552 in the finite automaton 510 with the respective paths in the input regular expression 534. For instance, the automaton construction logic 514 may generate the mapping information 546 based on an analysis of the relationship information 536, the derivative information 542, the relative priority information 544, the nodes 554, and/or the transitions 556.

In an example embodiment, the finite automaton is a deterministic finite automaton. A deterministic finite automaton is a finite-state machine for which each transition of the finite-state machine is uniquely determined by a corresponding source node and a corresponding input element and for which reading an input element is required for each transition to another node. In an aspect of this embodiment, each node of the deterministic finite automaton transitions to a single other node. In another aspect of this embodiment, the finite automaton is configured as a deterministic finite automaton based on a length of the input regular expression being less than or equal to a length threshold.

In another example embodiment, the finite automaton is a nondeterministic finite automaton. A nondeterministic finite automaton is a finite-state machine that does not constitute a deterministic finite automaton. In an aspect of this embodiment, each node of the nondeterministic finite automaton is capable of transitioning to any suitable number of nodes (e.g., multiple nodes). In an example of this aspect, an order of the transitions from each node are ordered in the same way that the transitions in a deterministic finite automaton would be ordered. In another aspect of this embodiment, the finite automaton is configured as a nondeterministic finite automaton based on a length of the input regular expression being greater than or equal to a length threshold.

In yet another example embodiment, the finite automaton includes a deterministic finite automaton and a nondeterministic finite automaton. In accordance with this embodiment, constructing the finite automaton at step 404 includes constructing the deterministic finite automaton until a criterion is satisfied. For example, the criterion may require that a number of transitions in the graph reaches a threshold number. In another example, the criterion may require that a number of nodes in the graph reaches a threshold number. In yet another example, the criterion may require that an amount of available memory is less than or equal to a threshold amount (e.g., because the deterministic finite automaton consumes more memory than the nondeterministic finite automaton). In accordance with this embodiment, constructing the finite automaton at step 404 further includes initiating construction of the nondeterministic finite automaton based on the criterion being satisfied. In further accordance with this embodiment, the deterministic finite automaton includes a first subset of the nodes in the graph and a first subset of the transitions in the graph, and the nondeterministic finite automaton includes a second subset of the nodes in the graph and a second subset of the transitions in the graph. The first and second subsets of the nodes are different (e.g., mutually exclusive). The first and second subsets of the transitions are different (e.g., mutually exclusive).

In still another example embodiment, causing the nodes to be included in the graph at step 410 includes, for each of the derived regular expressions, waiting to cause the node that represents the respective derived regular expression to be included in the graph until the respective derived regular expression is evaluated with regard to an input character sequence. For instance, each node may be added to the graph in real-time (e.g., on-the-fly) as the derived regular expression that is represented by the node is evaluated. By waiting to cause nodes to be included in the graph in this manner, it can be said that the finite automaton is constructed "lazily." In an example implementation, the node generation logic 526 waits to cause a node that represents each derived regular expression to be included in the graph 552 until the respective derived regular expression is evaluated on an input character sequence 538. In accordance with this embodiment, causing the transitions to be included in the graph at step 412 includes waiting to cause a transition between each identified node in the corpus and each other node in the corpus that represents a regular expression derivative of the regular expression represented by the respective identified node to be included in the graph until the regular expression represented by the respective identified node is evaluated with regard to the input character sequence. In an example implementation, the transition generation logic 528 causes a transition between each source node in the nodes 554 and each other node in the nodes 554 that represents a regular expression derivative of the regular expression represented by the respective source node to be included in the graph 552 until the regular expression represented by the respective source node is evaluated with regard to the input character sequence 538. A source node is a node from which a transition originates, whereas a destination node is a node at which a transition ends. It can be said that the source node and the destination node define the transition. In an example, each transition may be added to the graph in real-time as the source and destination nodes that define the transition are added to the graph.

In another example embodiment, constructing the finite automaton at step 404 is performed independently from an input character sequence with regard to which the input regular expression is evaluated. For instance, the finite automaton may be constructed prior to receipt of the input character sequence. By constructing the finite automaton independently from the input character sequence, it can be said that the finite automaton is constructed "greedily" or "promptly." In an example implementation, the automaton construction logic 514 constructs the finite automaton 510 independently from the input character sequence 538 with regard to which the input regular expression 534 is evaluated.

At step 414, priorities are assigned to respective branches of the graph in the finite automaton. The priorities correspond to the order in which the respective paths in the input regular expression are to be evaluated by the backtracking engine. In an example implementation, the priority logic 516 assigns priorities 558 to the respective branches of the graph 552 in the finite automaton 510 such that the priorities 558 correspond to the order in which the respective paths in the input regular expression 534 are to be evaluated by the backtracking engine. For instance, the priority logic 516 may map (e.g., correlate) the branches of the graph 552 in the finite automaton 510 to the respective paths in the input regular expression 534 based on the path order information 540 (e.g., based on the path order information 540 specifying the order in which the paths in the input regular expression 534 are to be evaluated by the backtracking engine) and further based on the mapping information 546 (e.g., based on the mapping information 546 cross-referencing the branches of the graph 552 in the finite automaton 510 with the respective paths in the input regular expression 534).

In an example embodiment, the behavior of the backtracking engine indicates which portion of an input character sequence is to be included in a capture. In accordance with this embodiment, the priorities are assigned to the respective branches of the graph at step 414 based on the behavior of the backtracking engine indicating which portion of the input character sequence is to be included in the capture.

In some example embodiments, one or more steps 402, 404, 406, 408, 410, 412, and/or 414 of flowchart 400 may not be performed. Moreover, steps in addition to or in lieu of steps 402, 404, 406, 408, 410, 412, and/or 414 may be performed. For instance, in an example embodiment, the method of flowchart 400 further includes determining that an identified regular expression of the derived regular expressions establishes a loop that is capable of accepting zero repetitions of the identified regular expression and that is capable of accepting a positive number of repetitions of the identified regular expression. In an example implementation, the derivative determination logic 522 determines that the identified regular expression establishes the loop. In accordance with this embodiment, deriving the regular expressions at step 406 includes replacing the identified regular expression with an empty string based on the identified regular expression establishing the loop that is capable of accepting zero repetitions of the identified regular expression. In an example implementation, the derivative determination logic 522 replaces the identified regular expression with the empty string.

Figure 6:
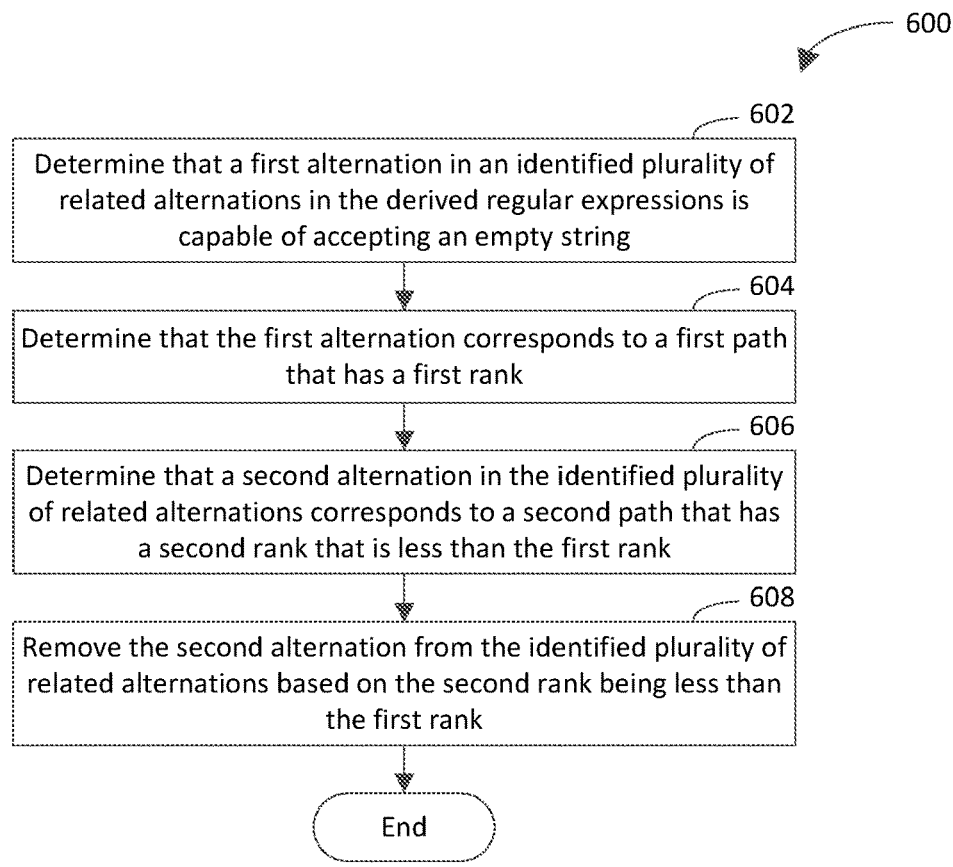
Figure 7:
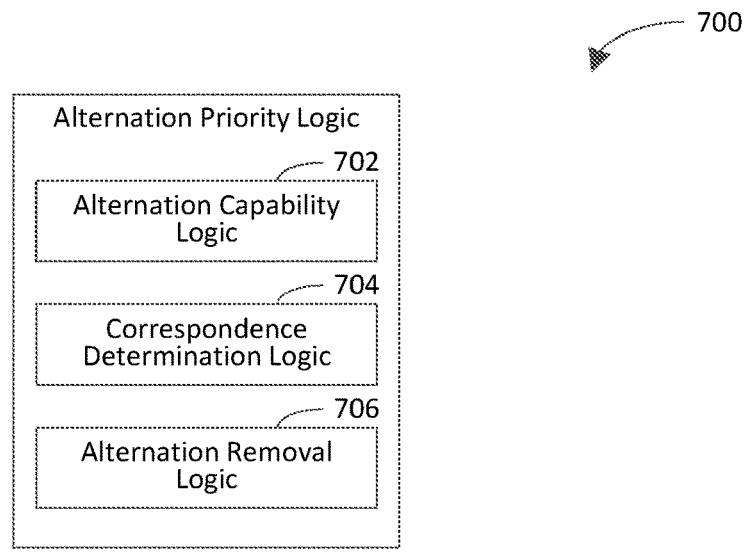
FIG. 7 is a block diagram of an example implementation of alternation priority logic shown in FIG. 5 in accordance with an embodiment.

In another example embodiment, the method of flowchart 400 further includes one or more steps shown in flowchart 600 of FIG. 6. Flowchart 600 may be performed by the alternation priority logic 524 shown in FIG. 5, for example. For illustrative purposes, flowchart 600 is described with respect to alternation priority logic 700 shown in FIG. 7, which is an example implementation of the alternation priority logic 524. As shown in FIG. 7, the alternation priority logic 700 includes alternation capability logic 702, correspondence determination logic 704, and alternation removal logic 706. Further structural and operational embodiments will be apparent to persons skilled in the relevant art(s) based on the discussion regarding flowchart 600.

In accordance with this embodiment, the order is based on ranks of the respective paths in the input regular expression. In further accordance with this embodiment, the priorities, which are assigned to the respective branches of the graph, are based on the respective ranks of the respective paths. As shown in FIG. 6, the method of flowchart 600 begins at step 602. In step 602, a determination is made that a first alternation in an identified plurality of related alternations in the derived regular expressions is capable of accepting an empty string. In an example implementation, the alternation capability logic 702 determines that the first alternation in the identified plurality of related alternations in the derived regular expressions is capable of accepting the empty string.

At step 604, a determination is made that the first alternation corresponds to a first path that has a first rank. In an example implementation, the correspondence determination logic 704 determines that the first alternation corresponds to the first path. The correspondence determination logic 704 further determines that the first path has the first rank (e.g., based on the path order information 540 indicating the first rank of the first path).

At step 606, a determination is made that a second alternation in the identified plurality of related alternations corresponds to a second path that has a second rank that is less than the first rank. In an example implementation, the correspondence determination logic 704 determines that the second alternation corresponds to the second path. The correspondence determination logic 704 further determines that the second path has the second rank (e.g., based on the path order information 540 indicating the second rank of the second path).

At step 608, the second alternation is removed from the identified plurality of related alternations based on the second rank being less than the first rank. In an example implementation, the alternation removal logic 706 removes the second alternation from the identified plurality of related alternations based on the second rank being less than the first rank. For instance, the alternation removal logic 706 may compare the first rank and the second rank to determine that the second rank is less than the first rank.

In an aspect of this embodiment, the identified plurality of related alternations are represented by a same node of the nodes in the graph. In accordance with this aspect, the finite automaton may be a deterministic finite automaton.

In another aspect of this embodiment, the identified plurality of related alternations are represented by respective nodes in the graph. In accordance with this aspect, the finite automaton may be a nondeterministic finite automaton.

In yet another example embodiment, the method of flowchart 400 further includes determining that an input character sequence includes a sub string that corresponds to the input regular expression by identifying a sequence of consecutive nodes in the graph that maps to the substring in the input character sequence based on the behavior of the backtracking engine. In an example implementation, the matching logic 518 determines that the input character sequence 538 includes a sub string that corresponds to the input regular expression 534 by identifying a sequence of consecutive nodes in the graph 552 that maps to the substring in the input character sequence 538 based on the behavior of the backtracking engine. For instance, the matching logic 518 may make the determination by using the input character sequence 538 to walk the graph 552. The matching logic 518 may store metadata 550 for one or more nodes (e.g., the first node or all nodes) in the sequence of consecutive nodes (e.g., as the respective node is traversed) to facilitate making the determination, though the example embodiments are not limited in this respect. For instance, the determination may be made without the metadata 550 in accordance with the backward traversal aspect described below, or the determination may be made with the metadata 550 in accordance with the metadata storing aspect described below. The matching logic 518 may generate a performance instruction 548 based on the determination. The performance instruction 548 instructs the action logic 520 to perform an action. 560. In accordance with this embodiment, the method of flowchart 400 further includes performing an action based on the substring in the input character sequence corresponding to the input regular expression. In an example implementation, the action logic 520 performs the action 560. For instance, the action logic 520 may perform the action 560 based on receipt of the performance instruction 548 (e.g., based on the performance instruction 548 instructing the action logic 520 to perform the action 560).

In backward traversal aspect of this embodiment, determining that the input character sequence includes the substring that corresponds to the input regular expression includes identifying an ending node (a.k.a. an accepting node) of the sequence of consecutive nodes in the graph based on the ending node being capable of accepting an empty string. In an example implementation, the matching logic 518 identifies the end node in the graph 552. In accordance with this aspect, based on the ending node being identified, each other node in the sequence of nodes is identified by traversing the sequence of consecutive nodes backward until a node that is not capable of accepting the empty string is reached. In an example implementation, the matching logic 518 identifies each other node in the sequence of nodes by traversing the sequence of consecutive nodes backward until a node that is not capable of accepting the empty string is reached. It should be noted that the matching logic 518 may traverse the sequence of nodes backward without using backtracking simulation (e.g., by considering all paths equally). For instance, by not using backtracking simulation to traverse the sequence of nodes backward, the matching logic 518 may avoid overlooking portions of the graph 552 that lead to valid matches.

In an implementation of the backward traversal aspect, the root node of the graph is defined by a pattern followed by the input regular expression. In accordance with this implementation, the pattern is configured to accept an arbitrary string with a fewest number of characters that enables the substring to correspond to the input regular expression. For instance, the root node may be defined by .*?R, where the pattern .*? accepts an arbitrary string with a fewest number of characters possible, and where R is the input regular expression. Defining the root node in this manner may allow the match to start from anywhere in the graph, but preferably as early as possible.

In an example of this implementation, identifying each other node in the sequence of nodes includes identifying a starting node of the sequence of consecutive nodes as being an earliest node in the corpus of nodes that accepts the empty string by evaluating the input regular expression in a reverse order on the input character sequence. In an example implementation, the matching logic 518 identifies the starting node of the sequence of consecutive nodes as being the earliest node in the nodes 554 that accepts the empty string by evaluating the input regular expression 534 in the reverse order on the input character sequence 538. When evaluating the input regular expression 534 in the reverse order, the matching logic 518 may not use the symbol .*? as a prefix on the input regular expression 534 (e.g., to avoid pruning paths that may lead to a valid match).

In another implementation of the backward traversal aspect, identifying the ending node of the sequence of consecutive nodes in the graph includes identifying multiple possible ending nodes of the sequence of nodes in the graph. In an example implementation, the matching logic 518 identifies the possible ending nodes of the sequence of nodes in the graph 552. Identifying the possible ending nodes includes identifying a last possible ending node of the possible ending nodes by performing a first operation and a second operation. The first operation includes evaluating the input regular expression on the input character sequence until a node that represents nothing is reached or until an end of the input character sequence is reached. In an example implementation, the matching logic 518 evaluates the input regular expression 534 on the input character sequence 538 until a node that represents nothing is reached or until an end of the input character sequence 538 is reached. The second operation includes identifying a last node that is capable of accepting the empty string prior to reaching the node that represents nothing or prior to reaching the end of the input character sequence to be the last possible ending node. In an example implementation, the matching logic 518 identifies the last node that is capable of accepting the empty string prior to reaching the node that represents nothing or prior to reaching the end of the input character sequence 538 to be the last possible ending node.

Figure 8:
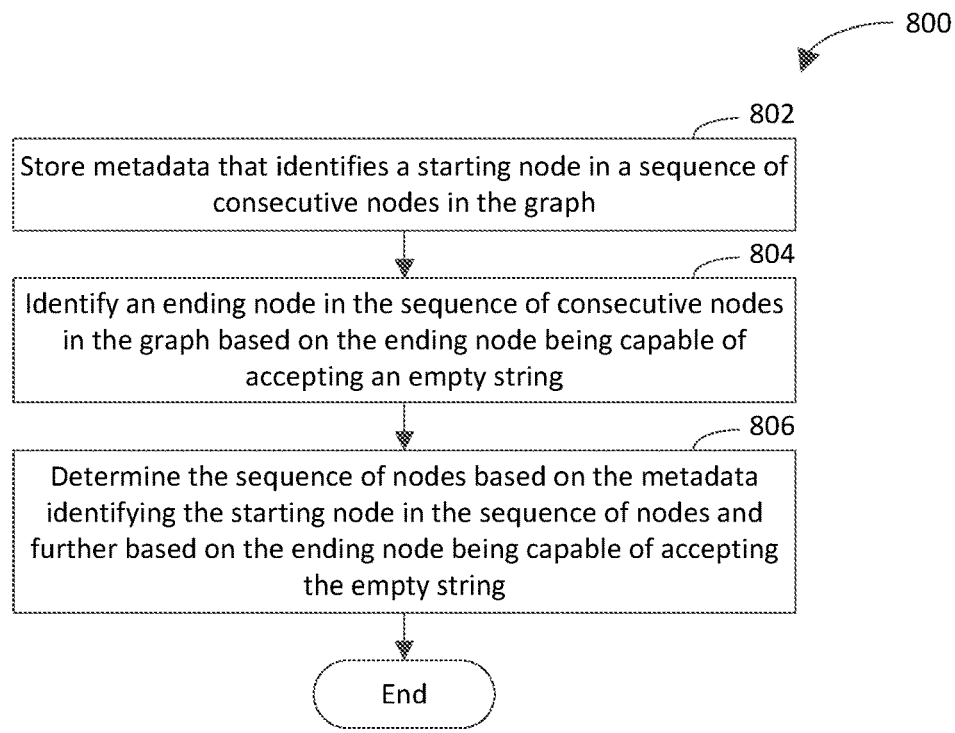
FIG. 8 depicts a flowchart of an example method for determining that an input character sequence includes a substring that corresponds to an input regular expression in accordance with an embodiment.
Figure 9:
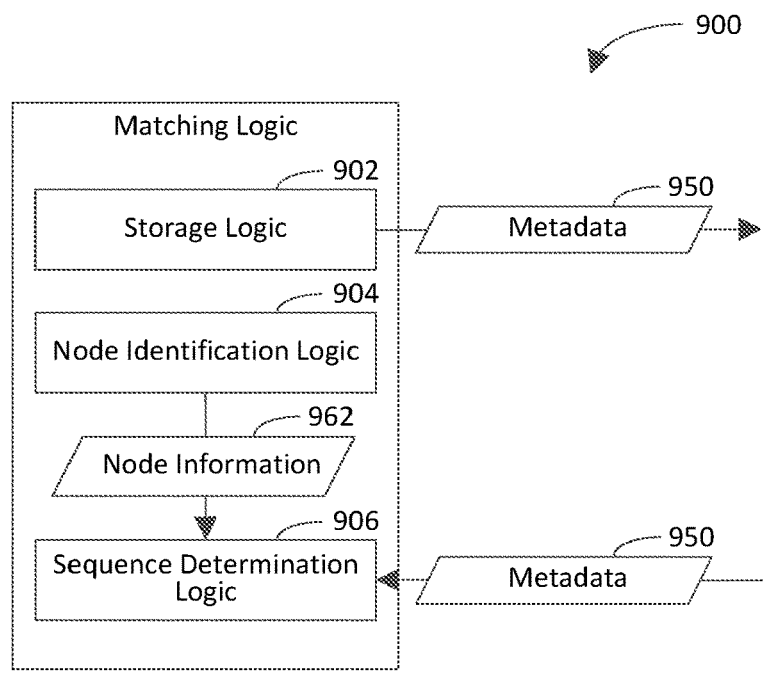
FIG. 9 is a block diagram of an example implementation of matching logic shown in FIG. 5 in accordance with an embodiment.

In a metadata storing aspect of this embodiment, the method of flowchart 400 further includes one or more steps shown in flowchart 800 of FIG. 8. Flowchart 800 may be performed by the matching logic 518 shown in FIG. 5, for example. For illustrative purposes, flowchart 800 is described with respect to matching logic 900 shown in FIG. 9, which is an example implementation of the matching logic 518. As shown in FIG. 9, the matching logic 900 includes storage logic 902, node identification logic 904, and sequence determination logic 906. Further structural and operational embodiments will be apparent to persons skilled in the relevant art(s) based on the discussion regarding flowchart 800.

As shown in FIG. 8, the method of flowchart 800 begins at step 802. In step 802, metadata is stored that identifies a starting node in a sequence of consecutive nodes in the graph. In an example implementation, the storage logic 902 stores metadata 950 that identifies the starting node in the sequence of consecutive nodes in the graph (e.g., graph 552).

At step 804, an ending node in the sequence of consecutive nodes in the graph is identified based on the ending node being capable of accepting an empty string. In an example implementation, the node identification logic 904 identifies the ending node in the sequence of consecutive nodes in the graph based on the ending node being capable of accepting an empty string. In accordance with this implementation, the node identification logic 904 may generate node information 962 to indicate (e.g., specify) the ending node (e.g., as a result of the ending node being capable of accepting the empty string).

At step 806, the sequence of nodes is determined based on the metadata identifying the starting node in the sequence of nodes and further based on the ending node being capable of accepting the empty string. In an example implementation, the sequence determination logic 906 determines the sequence of nodes based on the metadata 950 identifying the starting node in the sequence of nodes and further based on the node information 962 indicating the ending node.

In yet another aspect of this embodiment, a regular expression derivative of the input regular expression with regard to a designated character in the input character sequence includes a first alternation and a second alternation. The first alternation includes an empty string. The second alternation includes a textual element. In accordance with this embodiment, determining that the input character sequence includes the substring that corresponds to the input regular expression includes determining that the textual element does not correspond to a portion of the input character sequence that follows the designated character in the input character sequence. In further accordance with this embodiment, determining that the input character sequence includes the substring that corresponds to the input regular expression further includes determining that the input character sequence includes the substring that corresponds to the input regular expression based on the first alternation including the empty string even though the textual element does not correspond to the portion of the input character sequence that follows the designated character in the input character sequence.

In still another example aspect of this embodiment, determining that the input character sequence includes the substring that corresponds to the input regular expression includes reviewing each character of the input character sequence a number of times that is less than or equal to a threshold number of times. The threshold number of times may be any suitable number of times (e.g., 1, 2, 3, or 4). For instance, the threshold number may be a fixed integer.

It will be recognized that the computing system 500 may not include one or more of the regular expression derivatives-based backtracking engine simulation logic 508, the behavior detection logic 512, the automaton construction logic 514, the priority logic 516, the matching logic 518, the action logic 520, the derivative determination logic 522, the alternation priority logic 524, the node generation logic 526, the transition generation logic 528, and/or the store 530. Furthermore, the computing system 500 may include components in addition to or in lieu of the regular expression derivatives-based backtracking engine simulation logic 508, the behavior detection logic 512, the automaton construction logic 514, the priority logic 516, the matching logic 518, the action logic 520, the derivative determination logic 522, the alternation priority logic 524, the node generation logic 526, the transition generation logic 528, and/or the store 530.

Figure 10:
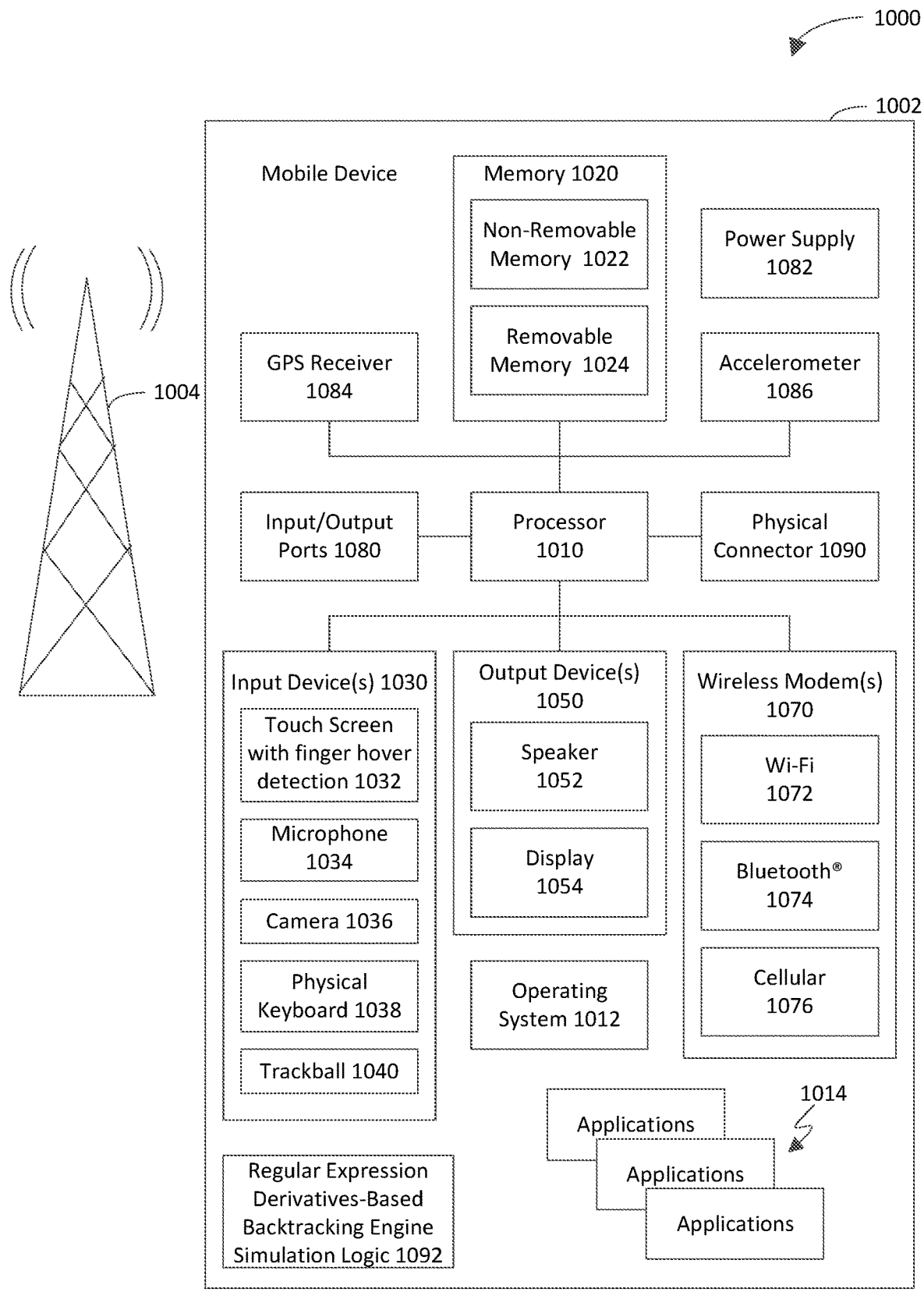
FIG. 10 is a system diagram of an example mobile device in accordance with an embodiment.

FIG. 10 is a system diagram of an example mobile device 1000 including a variety of optional hardware and software components, shown generally as 1002. Any components 1002 in the mobile device may communicate with any other component, though not all connections are shown, for ease of illustration. The mobile device 1000 may be any of a variety of computing devices (e.g., cell phone, smartphone, handheld computer, Personal Digital Assistant (PDA), etc.) and may allow wireless two-way communications with one or more mobile communications networks 1004, such as a cellular or satellite network, or with a local area or wide area network.

The mobile device 1000 includes a processor 1010 (e.g., signal processor, microprocessor, ASIC, or other control and processing logic circuitry) for performing such tasks as signal coding, data processing, input/output processing, power control, and/or other functions. An operating system 1012 may control the allocation and usage of the components 1002 and support for one or more applications 1014 (a.k.a. application programs). The applications 1014 may include common mobile computing applications (e.g., email applications, calendars, contact managers, web browsers, messaging applications) and any other computing applications (e.g., word processing applications, mapping applications, media player applications).

The mobile device 1000 includes regular expression derivatives-based backtracking engine simulation logic 1092, which is operable in a manner similar to the regular expression derivatives-based backtracking engine simulation logic 108 described above with reference to FIG. 1 and/or the regular expression derivatives-based backtracking engine simulation logic 508 described above with reference to FIG. 5.

The mobile device 1000 includes memory 1020. The memory 1020 includes non-removable memory 1022 and/or removable memory 1024. The non-removable memory 1022 may include random access memory (RAM), read-only memory (ROM), flash memory, a hard disk, or other well-known memory storage technologies. The removable memory 1024 may include flash memory or a Subscriber Identity Module (SIM) card, which is well known in Global System for Mobile Communications (GSM) systems, or other well-known memory storage technologies, such as "smart cards." The memory 1020 may store data and/or code for running the operating system 1012, the applications 1014, and the regular expression derivatives-based backtracking engine simulation logic 1092. Example data may include web pages, text, images, sound files, video data, or other data sets to be sent to and/or received from one or more network servers or other devices via one or more wired or wireless networks. Memory 1020 may store a subscriber identifier, such as an International Mobile Subscriber Identity (IMSI), and an equipment identifier, such as an International Mobile Equipment Identifier (IMEI). Such identifiers may be transmitted to a network server to identify users and equipment. The mobile device 1000 may support one or more input devices 1030, such as a touch screen 1032, microphone 1034, camera 1036, physical keyboard 1038 and/or trackball 1040 and one or more output devices 1050, such as a speaker 1052 and a display 1054. Touch screens, such as the touch screen 1032, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 1032 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 1032 and display 1054 may be combined in a single input/output device. The input devices 1030 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1012 or applications 1014 may include speech-recognition software as part of a voice control interface that allows a user to operate the mobile device 1000 via voice commands. Furthermore, the mobile device 1000 may include input devices and software that allows for user interaction via a user's spatial gestures, such as detecting and interpreting gestures to provide input to a gaming application.

Wireless modem(s) 1070 may be coupled to antenna(s) (not shown) and may support two-way communications between the processor 1010 and external devices, as is well understood. The modem(s) 1070 are shown generically and include a cellular modem 1076 for communicating with the mobile communication network 1004 and/or other radio-based modems (e.g., Bluetooth® 1074 and/or Wi-Fi 1072). At least one of the wireless modem(s) 1070 is typically configured for communication with one or more cellular networks, such as a GSM network for data and voice communications within a single cellular network, between cellular networks, or between the mobile device and a public switched telephone network (PSTN).

The mobile device 1000 further includes at least one input/output port 1080, a power supply 1082, a satellite navigation system receiver 1084 (e.g., a Global Positioning System (GPS) receiver), an accelerometer 1086, and a physical connector 1090, which may be a universal serial bus (USB) port, IEEE 1394 (FireWire) port, and/or RS-232 port. The illustrated components 1002 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the regular expression derivatives-based backtracking engine simulation logic 108, the finite automaton 110, the regular expression derivatives-based backtracking engine simulation logic 508, the behavior detection logic 512, the automaton construction logic 514, the priority logic 516, the matching logic 518, the action logic 520, the derivative determination logic 522, the alternation priority logic 524, the node generation logic 526, the transition generation logic 528, the alternation capability logic 702, the correspondence determination logic 704, the alternation removal logic 706, the storage logic 902, the node identification logic 904, the sequence determination logic 906, flowchart 400, flowchart 600, and/or flowchart 800 may be implemented in hardware, software, firmware, or any combination thereof.

For example, any one or more of the regular expression derivatives-based backtracking engine simulation logic 108, the finite automaton 110, the regular expression derivatives-based backtracking engine simulation logic 508, the behavior detection logic 512, the automaton construction logic 514, the priority logic 516, the matching logic 518, the action logic 520, the derivative determination logic 522, the alternation priority logic 524, the node generation logic 526, the transition generation logic 528, the alternation capability logic 702, the correspondence determination logic 704, the alternation removal logic 706, the storage logic 902, the node identification logic 904, the sequence determination logic 906, flowchart 400, flowchart 600, and/or flowchart 800 may be implemented, at least in part, as computer program code configured to be executed in one or more processors.

In another example, any one or more of the regular expression derivatives-based backtracking engine simulation logic 108, the finite automaton 110, the regular expression derivatives-based backtracking engine simulation logic 508, the behavior detection logic 512, the automaton construction logic 514, the priority logic 516, the matching logic 518, the action logic 520, the derivative determination logic 522, the alternation priority logic 524, the node generation logic 526, the transition generation logic 528, the alternation capability logic 702, the correspondence determination logic 704, the alternation removal logic 706, the storage logic 902, the node identification logic 904, the sequence determination logic 906, flowchart 400, flowchart 600, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
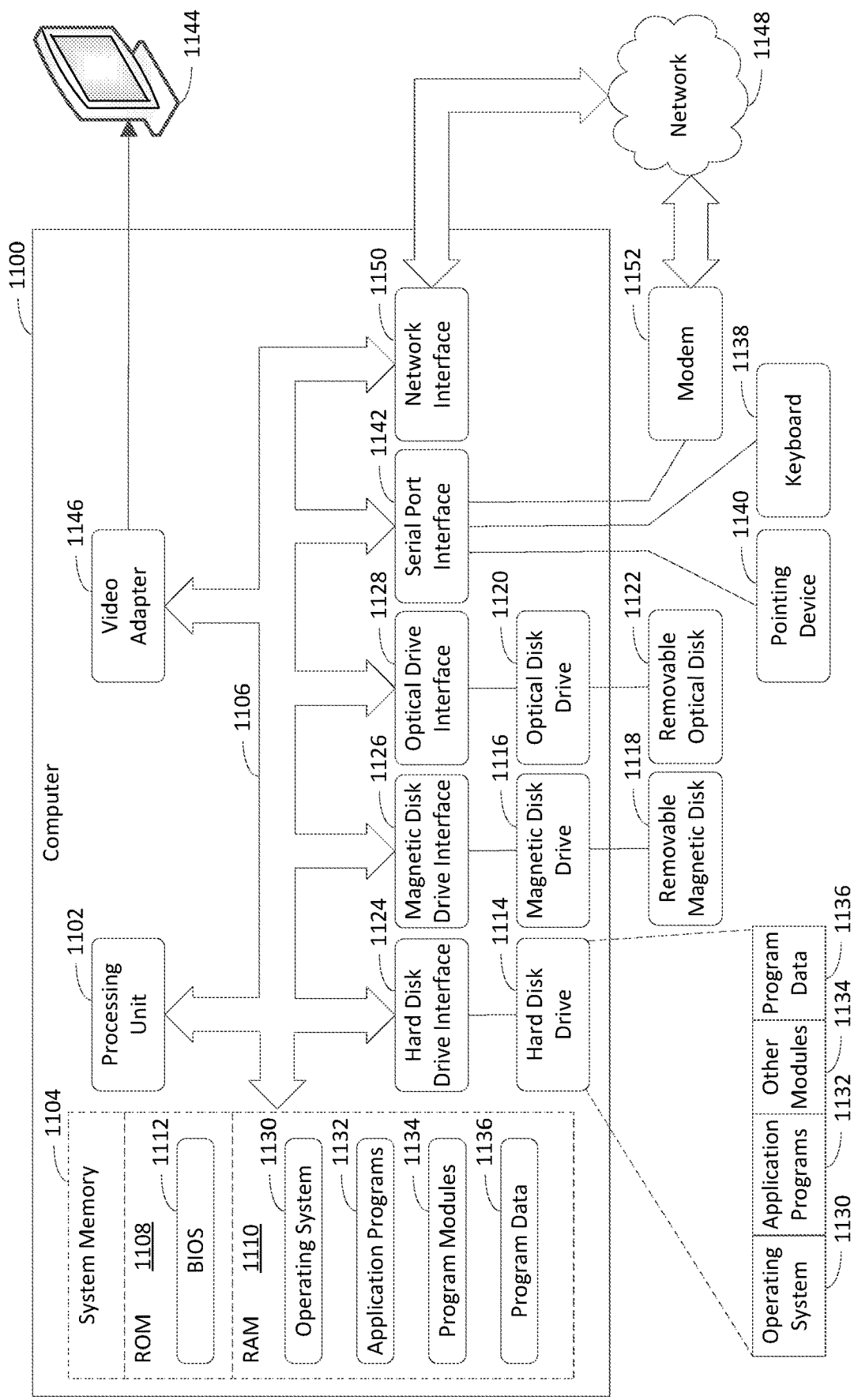
FIG. 11 depicts an example computer in which embodiments may be implemented.

II. Further Discussion of Some Example Embodiments (A1) An example system (FIG. 1, 102A-102M, 106A-106N; FIG. 5, 500; FIG. 10, 1000; FIG. 11, 1100) comprises a memory (FIG. 10, 1020, 1022, 1024; FIG. 11, 1104, 1108, 1110) and a processing system (FIG. 10, 1010; FIG. 11, 1102) coupled to the memory. The processing system is configured to determine (FIG. 4, 402) behavior of a backtracking engine, the behavior indicating an order in which a plurality of paths in an input regular expression (FIG. 5, 534) are to be evaluated by the backtracking engine. The processing system is further configured to construct (FIG. 4, 404) a finite automaton (FIG. 5, 510) that represents the input regular expression using a plurality of regular expression derivatives that are based on the input regular expression. The finite automaton includes a graph (FIG. 5, 552) that includes a root node that represents the input regular expression. Construction of the finite automaton comprises deriving (FIG. 4, 406) a plurality of regular expressions such that each regular expression of the plurality of regular expressions is a regular expression derivative of the input regular expression with regard to a character in an alphabet or a regular expression derivative of another regular expression of the plurality of regular expressions with regard to a character in the alphabet. Construction of the finite automaton further comprises assigning (FIG. 4, 408) a plurality of relative priorities to each plurality of respective related alternations in the plurality of regular expressions to correspond to an order in which the behavior indicates that the respective plurality of related alternations are to be evaluated by the backtracking engine. Construction of the finite automaton further comprises causing (FIG. 4, 410) a plurality of nodes that represent the plurality of respective regular expressions to be included in the graph. Construction of the finite automaton further comprises causing (FIG. 4, 412) a plurality of transitions (FIG. 5, 556) between respective pairs of nodes in a corpus of nodes (FIG. 5, 554) that includes the root node and the plurality of nodes to be included in the graph. The processing system is further configured to assign (FIG. 4, 414) a plurality of priorities (FIG. 5, 558) to a plurality of respective branches of the graph in the finite automaton. The plurality of priorities corresponds to the order in which the plurality of respective paths in the input regular expression are to be evaluated by the backtracking engine.

(A2) In the example system of A1, wherein an identified regular expression in the graph includes a first alternation, which is capable of accepting an empty string, followed by a second alternation; and wherein the processing system is configured to: define a regular expression derivative of the identified regular expression to be a derivative of the second alternation or a derivative of the identified regular expression based on the behavior of the backtracking engine indicating that the first alternation prioritizes acceptance of the empty string over acceptance of a different element; or define the regular expression derivative of the identified regular expression to be a derivative of the first alternation or a derivative of the second alternation based on the behavior of the backtracking engine indicating that the first alternation does not prioritize acceptance of the empty string over acceptance of a different element.

(A3) In the example system of any of A1-A2, wherein the behavior of the backtracking engine indicates which portion of an input character sequence is to be included in a capture; and wherein the processing system is configured to: assign the plurality of priorities to the plurality of respective branches of the graph in the finite automaton based at least in part on the behavior of the backtracking engine indicating which portion of the input character sequence is to be included in the capture.

(A4) In the example system of any of A1-A3, wherein the order is based on a plurality of ranks of the plurality of respective paths in the input regular expression; wherein the plurality of priorities, which are assigned to the plurality of respective branches of the graph, is based on the plurality of respective ranks of the plurality of respective paths; and wherein the processing system is configured to: determine that a first alternation in an identified plurality of related alternations in the plurality of regular expressions is capable of accepting an empty string; determine that the first alternation corresponds to a first path that has a first rank; determine that a second alternation in the identified plurality of related alternations corresponds to a second path that has a second rank that is less than the first rank; and remove the second alternation from the identified plurality of related alternations based on the second rank being less than the first rank.

(A5) In the example system of any of A1-A4, wherein the identified plurality of related alternations are represented by a same node of the plurality of nodes in the graph.

(A6) In the example system of any of A1-A5, wherein the identified plurality of related alternations are represented by respective nodes in the graph.

(A7) In the example system of any of A1-A6, wherein the processing system is configured to: determine that an identified regular expression of the plurality of regular expressions establishes a loop that is capable of accepting zero repetitions of the identified regular expression and that is capable of accepting a positive number of repetitions of the identified regular expression; and replace the identified regular expression with an empty string based on the identified regular expression establishing the loop that is capable of accepting zero repetitions of the identified regular expression.

(A8) In the example system of any of A1-A7, wherein the finite automaton is a deterministic finite automaton.

(A9) In the example system of any of A1-A7, wherein the finite automaton is a nondeterministic finite automaton.

(A10) In the example system of any of A1-A9, wherein the finite automaton includes a deterministic finite automaton and a nondeterministic finite automaton; and wherein the processing system is configured to: construct the deterministic finite automaton until a criterion is satisfied, the deterministic finite automaton including a first subset of the plurality of nodes and a first subset of the plurality of transitions; and initiate construction of the nondeterministic finite automaton based on the criterion being satisfied, the nondeterministic finite automaton including a second subset of the plurality of nodes and a second subset of the plurality of transitions.

(A11) In the example system of any of A1-A10, wherein the behavior of the backtracking engine is defined by a Perl compatible regular expressions library.

(A12) In the example system of any of A1-A11, wherein the processing system is further configured to: determine that an input character sequence includes a substring that corresponds to the input regular expression by identifying a sequence of consecutive nodes in the graph that maps to the substring in the input character sequence based on the behavior of the backtracking engine; and perform an action based on the substring in the input character sequence corresponding to the input regular expression.

(A13) In the example system of any of A1-A12, wherein the processing system is configured to determine that the input character sequence includes the substring that corresponds to the input regular expression by performing the following operations: identify an ending node of the sequence of consecutive nodes in the graph based on the ending node being capable of accepting an empty string; and based on the ending node being identified, identify each other node in the sequence of nodes by traversing the sequence of consecutive nodes backward until a node that is not capable of accepting the empty string is reached.

(A14) In the example system of any of A1-A13, wherein the root node of the graph is defined by a pattern followed by the input regular expression, the pattern configured to accept an arbitrary string with a fewest number of characters that enables the substring to correspond to the input regular expression.

(A15) In the example system of any of A1-A14, wherein the processing system is configured to identify each other node in the sequence of nodes by identifying a starting node of the sequence of consecutive nodes as being an earliest node in the corpus of nodes that accepts the empty string by evaluating the input regular expression in a reverse order on the input character sequence.

(A16) In the example system of any of A1-A15, wherein the processing system is configured to: identify a plurality of possible ending nodes of the sequence of nodes in the graph, including identifying a last possible ending node of the plurality of possible ending nodes by performing the following operations: evaluate the input regular expression on the input character sequence until a node that represents nothing is reached or until an end of the input character sequence is reached; and identify a last node that is capable of accepting the empty string prior to reaching the node that represents nothing or prior to reaching the end of the input character sequence to be the last possible ending node of the plurality of possible ending nodes.

(A17) In the example system of any of A1-A16, wherein the processing system is configured to determine that the input character sequence includes the substring that corresponds to the input regular expression by performing the following operations: store metadata that identifies a starting node in the sequence of consecutive nodes in the graph; identify an ending node in the sequence of consecutive nodes in the graph based on the ending node being capable of accepting an empty string; and determine the sequence of nodes based on the metadata identifying the starting node in the sequence of nodes and further based on the ending node being capable of accepting the empty string.

(A18) In the example system of any of A1-A17, wherein a regular expression derivative of the input regular expression with regard to a designated character in the input character sequence includes a first alternation and a second alternation, the first alternation including an empty string, the second alternation including a textual element; and wherein the processing system is configured to determine that the input character sequence includes the substring that corresponds to the input regular expression by performing the following operations: determine that the textual element does not correspond to a portion of the input character sequence that follows the designated character in the input character sequence; and determine that the input character sequence includes the substring that corresponds to the input regular expression based on the first alternation including the empty string even though the textual element does not correspond to the portion of the input character sequence that follows the designated character in the input character sequence.

(A19) In the example system of any of A1-A18, wherein the processing system is configured to determine that the input character sequence includes the substring that corresponds to the input regular expression by reviewing each character of the input character sequence a number of times that is less than or equal to a threshold number of times.

(A20) In the example system of any of A1-A19, wherein the processing system is configured to: for each regular expression of the plurality of regular expressions, wait to cause the node that represents the respective regular expression to be included in the graph until the respective regular expression is evaluated with regard to an input character sequence; and wait to cause a transition between each identified node in the corpus and each other node in the corpus that represents a regular expression derivative of the regular expression represented by the respective identified node to be included in the graph until the regular expression represented by the respective identified node is evaluated with regard to the input character sequence.

(A21) In the example system of any of A1-A20, wherein the processing system is configured to: construct the finite automaton, which represents the input regular expression, independently from an input character sequence with regard to which the input regular expression is evaluated.

(A22) In the example system of any of A1-A21, wherein the processing system is configured to: for each regular expression of the plurality of regular expressions that is not represented by a node in the graph, create the node, which represents the regular expression, in the graph; and for each regular expression of the plurality of regular expressions that is represented by an existing node in the graph, use the existing node to represent the regular expression rather than creating another node to represent the regular expression.

(B1) An example method is implemented by a computing system (FIG. 1, 102A-102M, 106A-106N; FIG. 5, 500; FIG. 10, 1000; FIG. 11, 1100). The method comprises determining (FIG. 4, 402) behavior of a backtracking engine, the behavior indicating an order in which a plurality of paths in an input regular expression (FIG. 5, 534) are to be evaluated by the backtracking engine. The method further comprises constructing (FIG. 4, 404) a finite automaton (FIG. 5, 510) that represents the input regular expression using a plurality of regular expression derivatives that are based on the input regular expression. The finite automaton includes a graph (FIG. 5, 552) that includes a root node that represents the input regular expression. The constructing comprises deriving (FIG. 4, 406) a plurality of regular expressions such that each regular expression of the plurality of regular expressions is a regular expression derivative of the input regular expression with regard to a character in an alphabet or a regular expression derivative of another regular expression of the plurality of regular expressions with regard to a character in the alphabet. The constructing further comprises assigning (FIG. 4, 408) a plurality of relative priorities to each plurality of respective related alternations in the plurality of regular expressions to correspond to an order in which the behavior indicates that the respective plurality of related alternations are to be evaluated by the backtracking engine. The constructing further comprises causing (FIG. 4, 410) a plurality of nodes that represent the plurality of respective regular expressions to be included in the graph. The constructing further comprises causing (FIG. 4, 412) a plurality of transitions (FIG. 5, 556) between respective pairs of nodes in a corpus of nodes (FIG. 5, 554) that includes the root node and the plurality of nodes to be included in the graph. The method further comprises assigning (FIG. 4, 414) a plurality of priorities (FIG. 5, 558) to a plurality of respective branches of the graph in the finite automaton. The plurality of priorities corresponds to the order in which the plurality of respective paths in the input regular expression are to be evaluated by the backtracking engine.

(B2) In the method of B1, wherein an identified regular expression in the graph includes a first alternation, which is capable of accepting an empty string, followed by a second alternation; and wherein deriving the plurality of regular expressions comprises: defining a regular expression derivative of the identified regular expression to be a derivative of the second alternation or a derivative of the identified regular expression based on the behavior of the backtracking engine indicating that the first alternation prioritizes acceptance of the empty string over acceptance of a different element; or defining the regular expression derivative of the identified regular expression to be a derivative of the first alternation or a derivative of the second alternation based on the behavior of the backtracking engine indicating that the first alternation does not prioritize acceptance of the empty string over acceptance of a different element.

(B3) In the method of any of B1-B2, wherein the behavior of the backtracking engine indicates which portion of an input character sequence is to be included in a capture; and wherein assigning the plurality of priorities to the plurality of respective branches of the graph comprises: assigning the plurality of priorities to the plurality of respective branches of the graph in the finite automaton based at least in part on the behavior of the backtracking engine indicating which portion of the input character sequence is to be included in the capture.

(B4) In the method of any of B1-B3, wherein the order is based on a plurality of ranks of the plurality of respective paths in the input regular expression; wherein the plurality of priorities, which are assigned to the plurality of respective branches of the graph, is based on the plurality of respective ranks of the plurality of respective paths; wherein the method further comprises: determining that a first alternation in an identified plurality of related alternations in the plurality of regular expressions is capable of accepting an empty string; determining that the first alternation corresponds to a first path that has a first rank; and determining that a second alternation in the identified plurality of related alternations corresponds to a second path that has a second rank that is less than the first rank; and wherein constructing the finite automaton further comprises: removing the second alternation from the identified plurality of related alternations based on the second rank being less than the first rank.

(B5) In the method of any of B1-B4, wherein the identified plurality of related alternations are represented by a same node of the plurality of nodes in the graph.

(B6) In the method of any of B1-B5, wherein the identified plurality of related alternations are represented by respective nodes in the graph.

(B7) In the method of any of B1-B6, further comprising: determining that an identified regular expression of the plurality of regular expressions establishes a loop that is capable of accepting zero repetitions of the identified regular expression and that is capable of accepting a positive number of repetitions of the identified regular expression; and wherein deriving the plurality of regular expressions comprises: replacing the identified regular expression with an empty string based on the identified regular expression establishing the loop that is capable of accepting zero repetitions of the identified regular expression.

(B8) In the method of any of B1-B7, wherein the finite automaton is a deterministic finite automaton.

(B9) In the method of any of B1-B7, wherein the finite automaton is a nondeterministic finite automaton.

(B10) In the method of any of B1-B9, wherein the finite automaton includes a deterministic finite automaton and a nondeterministic finite automaton; and wherein constructing the finite automaton comprises: constructing the deterministic finite automaton until a criterion is satisfied, the deterministic finite automaton including a first subset of the plurality of nodes and a first subset of the plurality of transitions; and initiating construction of the nondeterministic finite automaton based on the criterion being satisfied, the nondeterministic finite automaton including a second subset of the plurality of nodes and a second subset of the plurality of transitions.

(B11) In the method of any of B1-B10, wherein the behavior of the backtracking engine is defined by a Perl compatible regular expressions library.

(B12) In the method of any of B1-B11, further comprising: determining that an input character sequence includes a substring that corresponds to the input regular expression by identifying a sequence of consecutive nodes in the graph that maps to the substring in the input character sequence based on the behavior of the backtracking engine; and performing an action based on the substring in the input character sequence corresponding to the input regular expression.

(B13) In the method of any of B1-B12, wherein determining that the input character sequence includes the substring that corresponds to the input regular expression comprises: identifying an ending node of the sequence of consecutive nodes in the graph based on the ending node being capable of accepting an empty string; and based on the ending node being identified, identifying each other node in the sequence of nodes by traversing the sequence of consecutive nodes backward until a node that is not capable of accepting the empty string is reached.

(B14) In the method of any of B1-B13, wherein the root node of the graph is defined by a pattern followed by the input regular expression, the pattern configured to accept an arbitrary string with a fewest number of characters that enables the substring to correspond to the input regular expression.

(B15) In the method of any of B1-B14, wherein identifying each other node in the sequence of nodes comprises: identifying a starting node of the sequence of consecutive nodes as being an earliest node in the corpus of nodes that accepts the empty string by evaluating the input regular expression in a reverse order on the input character sequence.

(B16) In the method of any of B1-B15, wherein identifying the ending node of the sequence of consecutive nodes in the graph comprises: identifying a plurality of possible ending nodes of the sequence of nodes in the graph, including identifying a last possible ending node of the plurality of possible ending nodes by performing the following operations: evaluating the input regular expression on the input character sequence until a node that represents nothing is reached or until an end of the input character sequence is reached; and identifying a last node that is capable of accepting the empty string prior to reaching the node that represents nothing or prior to reaching the end of the input character sequence to be the last possible ending node of the plurality of possible ending nodes.

(B17) In the method of any of B1-B16, wherein determining that the input character sequence includes the substring that corresponds to the input regular expression comprises: storing metadata that identifies a starting node in the sequence of consecutive nodes in the graph; identifying an ending node in the sequence of consecutive nodes in the graph based on the ending node being capable of accepting an empty string; and determining the sequence of nodes based on the metadata identifying the starting node in the sequence of nodes and further based on the ending node being capable of accepting the empty string.

(B18) In the method of any of B1-B17, wherein a regular expression derivative of the input regular expression with regard to a designated character in the input character sequence includes a first alternation and a second alternation, the first alternation including an empty string, the second alternation including a textual element; and wherein determining that the input character sequence includes the substring that corresponds to the input regular expression comprises: determining that the textual element does not correspond to a portion of the input character sequence that follows the designated character in the input character sequence; and determining that the input character sequence includes the substring that corresponds to the input regular expression based on the first alternation including the empty string even though the textual element does not correspond to the portion of the input character sequence that follows the designated character in the input character sequence.

(B19) In the method of any of B1-B18, wherein determining that the input character sequence includes the substring that corresponds to the input regular expression comprises: reviewing each character of the input character sequence a number of times that is less than or equal to a threshold number of times.

(B20) In the method of any of B1-B19, wherein causing the plurality of nodes to be included in the graph comprises: for each regular expression of the plurality of regular expressions, waiting to cause the node that represents the respective regular expression to be included in the graph until the respective regular expression is evaluated with regard to an input character sequence; and wherein causing the plurality of transitions to be included in the graph comprises: waiting to cause a transition between each identified node in the corpus and each other node in the corpus that represents a regular expression derivative of the regular expression represented by the respective identified node to be included in the graph until the regular expression represented by the respective identified node is evaluated with regard to the input character sequence.

(B21) In the method of any of B1-B20, wherein constructing the finite automaton comprises: constructing the finite automaton, which represents the input regular expression, independently from an input character sequence with regard to which the input regular expression is evaluated.

(B22) In the method of any of B1-B21, wherein causing the plurality of nodes to be included in the graph comprises: for each regular expression of the plurality of regular expressions that is not represented by a node in the graph, creating the node, which represents the regular expression, in the graph; and for each regular expression of the plurality of regular expressions that is represented by an existing node in the graph, using the existing node to represent the regular expression rather than creating another node to represent the regular expression.

(C1) An example computer program product (FIG. 10, 1024; FIG. 11, 1118, 1122) comprising a computer-readable storage medium having instructions recorded thereon for enabling a processor-based system (FIG. 1, 102A-102M, 106A-106N; FIG. 5, 500; FIG. 10, 1000; FIG. 11, 1100) to perform operations. The operations comprise determining (FIG. 4, 402) behavior of a backtracking engine, the behavior indicating an order in which paths in an input regular expression (FIG. 5, 534) are to be evaluated by the backtracking engine. The operations further comprise constructing (FIG. 4, 404) a finite automaton (FIG. 5, 510) that represents the input regular expression using regular expression derivatives that are based on the input regular expression. The finite automaton includes a graph (FIG. 552) that includes a root node that represents the input regular expression. The constructing comprises deriving (FIG. 4, 406) regular expressions such that each derived regular expression is a regular expression derivative of the input regular expression or of another derived regular expression. The constructing further comprises assigning (FIG. 4, 408) relative priorities to each plurality of respective related alternations in the derived regular expressions to correspond to first priorities indicated by the behavior. The constructing further comprises causing (FIG. 4, 410) nodes that represent the respective derived regular expressions to be included in the graph. The constructing further comprises causing (FIG. 4, 412) transitions (FIG. 556) between respective pairs of nodes in a corpus of nodes (FIG. 5, 554) that includes the root node and the nodes that represent the respective derived regular expressions to be included in the graph. The operations further comprise assigning (FIG. 4, 414) second priorities (FIG. 5, 558) to respective branches of the graph in the finite automaton, the second priorities corresponding to the order in which the respective paths in the input regular expression are to be evaluated by the backtracking engine.

III. Example Computer System

FIG. 11 depicts an example computer 1100 in which embodiments may be implemented. Any one or more of the user devices 102A-102M and/or any one or more of the servers 106A-106N shown in FIG. 1 and/or computing system 500 shown in FIG. 5 may be implemented using computer 1100, including one or more features of computer 1100 and/or alternative features. Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments may be implemented in further types of computer systems, as would be known to persons skilled in the relevant art(s).

As shown in FIG. 11, computer 1100 includes a processing unit 1102, a system memory 1104, and a bus 1106 that couples various system components including system memory 1104 to processing unit 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic for implementing any one or more of (e.g., at least a portion of) the regular expression derivatives-based backtracking engine simulation logic 108, the finite automaton 110, the regular expression derivatives-based backtracking engine simulation logic 508, the behavior detection logic 512, the automaton construction logic 514, the priority logic 516, the matching logic 518, the action logic 520, the derivative determination logic 522, the alternation priority logic 524, the node generation logic 526, the transition generation logic 528, the alternation capability logic 702, the correspondence determination logic 704, the alternation removal logic 706, the storage logic 902, the node identification logic 904, the sequence determination logic 906, flowchart 400 (including any step of flowchart 400), flowchart 600 (including any step of flowchart 600), and/or flowchart 800 (including any step of flowchart 800), as described herein.

A user may enter commands and information into the computer 1100 through input devices such as keyboard 1138 and pointing device 1140. Other input devices (not shown) may include a microphone, joystick, game pad, satellite dish, scanner, touch screen, camera, accelerometer, gyroscope, or the like. These and other input devices are often connected to the processing unit 1102 through a serial port interface 1142 that is coupled to bus 1106, but may be connected by other interfaces, such as a parallel port, game port, or a universal serial bus (USB).

A display device 1144 (e.g., a monitor) is also connected to bus 1106 via an interface, such as a video adapter 1146. In addition to display device 1144, computer 1100 may include other peripheral output devices (not shown) such as speakers and printers.

Computer 1100 is connected to a network 1148 (e.g., the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable storage medium" are used to generally refer to media (e.g., non-transitory media) such as the hard disk associated with hard disk drive 1114, removable magnetic disk 1118, removable optical disk 1122, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of the computer 1100.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
a memory; and
a processing system coupled to the memory, the processing system configured to:
determine behavior of a backtracking engine, the behavior indicating an order in which a plurality of paths in an input regular expression are to be evaluated by the backtracking engine;
construct a finite automaton that represents the input regular expression using a plurality of regular expression derivatives that are based on the input regular expression, the finite automaton including a graph that includes a root node that represents the input regular expression, construction of the finite automaton comprising:
derive a plurality of regular expressions such that each regular expression of the plurality of regular expressions is a regular expression derivative of the input regular expression with regard to a character in an alphabet or a regular expression derivative of another regular expression of the plurality of regular expressions with regard to a character in the alphabet;
assign a plurality of relative priorities to each plurality of respective related alternations in the plurality of regular expressions to correspond to an order in which the behavior indicates that the respective plurality of related alternations are to be evaluated by the backtracking engine;
cause a plurality of nodes that represent the plurality of respective regular expressions to be included in the graph; and
cause a plurality of transitions between respective pairs of nodes in a corpus of nodes that includes the root node and the plurality of nodes to be included in the graph; and
assign a plurality of priorities to a plurality of respective branches of the graph in the finite automaton, the plurality of priorities corresponding to the order in which the plurality of respective paths in the input regular expression are to be evaluated by the backtracking engine.

2. The system of claim 1, wherein the order is based on a plurality of ranks of the plurality of respective paths in the input regular expression;
wherein the plurality of priorities, which are assigned to the plurality of respective branches of the graph, is based on the plurality of respective ranks of the plurality of respective paths; and
wherein the processing system is configured to:
determine that a first alternation in an identified plurality of related alternations in the plurality of regular expressions is capable of accepting an empty string;
determine that the first alternation corresponds to a first path that has a first rank;
determine that a second alternation in the identified plurality of related alternations corresponds to a second path that has a second rank that is less than the first rank; and
remove the second alternation from the identified plurality of related alternations based on the second rank being less than the first rank.

3. The system of claim 2, wherein the identified plurality of related alternations are represented by a same node of the plurality of nodes in the graph.

4. The system of claim 2, wherein the identified plurality of related alternations are represented by respective nodes in the graph.

5. The system of claim 1, wherein the processing system is configured to:
determine that an identified regular expression of the plurality of regular expressions establishes a loop that is capable of accepting zero repetitions of the identified regular expression and that is capable of accepting a positive number of repetitions of the identified regular expression; and
replace the identified regular expression with an empty string based on the identified regular expression establishing the loop that is capable of accepting zero repetitions of the identified regular expression.

6. The system of claim 1, wherein the processing system is further configured to:
determine that an input character sequence includes a substring that corresponds to the input regular expression by identifying a sequence of consecutive nodes in the graph that maps to the substring in the input character sequence based on the behavior of the backtracking engine; and
perform an action based on the substring in the input character sequence corresponding to the input regular expression.

7. The system of claim 6, wherein the processing system is configured to determine that the input character sequence includes the substring that corresponds to the input regular expression by performing the following operations:
identify an ending node of the sequence of consecutive nodes in the graph based on the ending node being capable of accepting an empty string; and
based on the ending node being identified, identify each other node in the sequence of nodes by traversing the sequence of consecutive nodes backward until a node that is not capable of accepting the empty string is reached.

8. The system of claim 7, wherein the root node of the graph is defined by a pattern followed by the input regular expression, the pattern configured to accept an arbitrary string with a fewest number of characters that enables the substring to correspond to the input regular expression.

9. The system of claim 8, wherein the processing system is configured to identify each other node in the sequence of nodes by identifying a starting node of the sequence of consecutive nodes as being an earliest node in the corpus of nodes that accepts the empty string by evaluating the input regular expression in a reverse order on the input character sequence.

10. The system of claim 7, wherein the processing system is configured to:
identify a plurality of possible ending nodes of the sequence of nodes in the graph, including identifying a last possible ending node of the plurality of possible ending nodes by performing the following operations:
evaluate the input regular expression on the input character sequence until a node that represents nothing is reached or until an end of the input character sequence is reached; and
identify a last node that is capable of accepting the empty string prior to reaching the node that represents nothing or prior to reaching the end of the input character sequence to be the last possible ending node of the plurality of possible ending nodes.

11. The system of claim 6, wherein the processing system is configured to determine that the input character sequence includes the sub string that corresponds to the input regular expression by performing the following operations:

store metadata that identifies a starting node in the sequence of consecutive nodes in the graph;

identify an ending node in the sequence of consecutive nodes in the graph based on the ending node being capable of accepting an empty string; and determine the sequence of nodes based on the metadata identifying the starting node in the sequence of nodes and further based on the ending node being capable of accepting the empty string.

12. The system of claim 6, wherein a regular expression derivative of the input regular expression with regard to a designated character in the input character sequence includes a first alternation and a second alternation, the first alternation including an empty string, the second alternation including a textual element; and wherein the processing system is configured to determine that the input character sequence includes the substring that corresponds to the input regular expression by performing the following operations:

determine that the textual element does not correspond to a portion of the input character sequence that follows the designated character in the input character sequence; and determine that the input character sequence includes the sub string that corresponds to the input regular expression based on the first alternation including the empty string even though the textual element does not correspond to the portion of the input character sequence that follows the designated character in the input character sequence.

13. The system of claim 6, wherein the processing system is configured to determine that the input character sequence includes the sub string that corresponds to the input regular expression by reviewing each character of the input character sequence a number of times that is less than or equal to a threshold number of times.

14. A method implemented by a computing system, the method comprising:

determining behavior of a backtracking engine, the behavior indicating an order in which a plurality of paths in an input regular expression are to be evaluated by the backtracking engine;

constructing a finite automaton that represents the input regular expression using a plurality of regular expression derivatives that are based on the input regular expression, the finite automaton including a graph that includes a root node that represents the input regular expression, the constructing comprising:

deriving a plurality of regular expressions such that each regular expression of the plurality of regular expressions is a regular expression derivative of the input regular expression with regard to a character in an alphabet or a regular expression derivative of another regular expression of the plurality of regular expressions with regard to a character in the alphabet;

assigning a plurality of relative priorities to each plurality of respective related alternations in the plurality of regular expressions to correspond to an order in which the behavior indicates that the respective plurality of related alternations are to be evaluated by the backtracking engine;

causing a plurality of nodes that represent the plurality of respective regular expressions to be included in the graph; and causing a plurality of transitions between respective pairs of nodes in a corpus of nodes that includes the root node and the plurality of nodes to be included in the graph; and assigning a plurality of priorities to a plurality of respective branches of the graph in the finite automaton, the plurality of priorities corresponding to the order in which the plurality of respective paths in the input regular expression are to be evaluated by the backtracking engine.

15. The method of claim 14, wherein an identified regular expression in the graph includes a first alternation, which is capable of accepting an empty string, followed by a second alternation; and wherein deriving the plurality of regular expressions comprises:

defining a regular expression derivative of the identified regular expression to be a derivative of the second alternation or a derivative of the identified regular expression based on the behavior of the backtracking engine indicating that the first alternation prioritizes acceptance of the empty string over acceptance of a different element; or defining the regular expression derivative of the identified regular expression to be a derivative of the first alternation or a derivative of the second alternation based on the behavior of the backtracking engine indicating that the first alternation does not prioritize acceptance of the empty string over acceptance of a different element.

16. The method of claim 14, wherein the behavior of the backtracking engine indicates which portion of an input character sequence is to be included in a capture; and wherein assigning the plurality of priorities to the plurality of respective branches of the graph comprises:

assigning the plurality of priorities to the plurality of respective branches of the graph in the finite automaton based at least in part on the behavior of the backtracking engine indicating which portion of the input character sequence is to be included in the capture.

17. The method of claim 14, wherein the finite automaton is a deterministic finite automaton.

18. The method of claim 14, wherein the finite automaton is a nondeterministic finite automaton.

19. The method of claim 14, wherein the finite automaton includes a deterministic finite automaton and a nondeterministic finite automaton; and wherein constructing the finite automaton comprises:

constructing the deterministic finite automaton until a criterion is satisfied, the deterministic finite automaton including a first subset of the plurality of nodes and a first subset of the plurality of transitions; and initiating construction of the nondeterministic finite automaton based on the criterion being satisfied, the nondeterministic finite automaton including a second subset of the plurality of nodes and a second subset of the plurality of transitions.

20. The method of claim 14, wherein the behavior of the backtracking engine is defined by a Perl compatible regular expressions library.

21. A computer program product comprising a computer-readable storage medium having instructions recorded thereon for enabling a processor-based system to perform operations, the operations comprising:

determining behavior of a backtracking engine, the behavior indicating an order in which paths in an input regular expression are to be evaluated by the backtracking engine;

constructing a finite automaton that represents the input regular expression using regular expression derivatives that are based on the input regular expression, the finite automaton including a graph that includes a root node that represents the input regular expression, the constructing comprising:

deriving regular expressions such that each derived regular expression is a regular expression derivative of the input regular expression or of another derived regular expression;

assigning relative priorities to each plurality of respective related alternations in the derived regular expressions to correspond to first priorities indicated by the behavior;

causing nodes that represent the respective derived regular expressions to be included in the graph; and causing transitions between respective pairs of nodes in a corpus of nodes that includes the root node and the nodes that represent the respective derived regular expressions to be included in the graph; and assigning second priorities to respective branches of the graph in the finite automaton, the second priorities corresponding to the order in which the respective paths in the input regular expression are to be evaluated by the backtracking engine.

* * * * *